United States Patent
Abari et al.

(10) Patent No.: US 11,415,683 B2
(45) Date of Patent: Aug. 16, 2022

(54) MOBILE SENSOR CALIBRATION

(71) Applicant: Lyft, Inc., San Francisco, CA (US)

(72) Inventors: Farzad Cyrus Foroughi Abari, San Bruno, CA (US); Forrest Samuel Briggs, Palo Alto, CA (US); Alexander Thomas Starns, Menlo Park, CA (US)

(73) Assignee: Lyft, Inc., San Francisco, CA (US)

( * ) Notice: Subject to any disclaimer, the term of this patent is extended or adjusted under 35 U.S.C. 154(b) by 522 days.

(21) Appl. No.: 15/857,518

(22) Filed: Dec. 28, 2017

(65) Prior Publication Data
US 2019/0204425 A1  Jul. 4, 2019

(51) Int. Cl.
| | | |
|---|---|---|
| *G01S 7/497* | (2006.01) | |
| *G01S 7/40* | (2006.01) | |
| *G01S 13/931* | (2020.01) | |
| *G05D 1/00* | (2006.01) | |
| *G05D 1/02* | (2020.01) | |
| *G01S 17/931* | (2020.01) | |

(52) U.S. Cl.
CPC .......... *G01S 7/497* (2013.01); *G01S 7/40* (2013.01); *G01S 7/4026* (2013.01); *G01S 13/931* (2013.01); *G01S 17/931* (2020.01); *G05D 1/0011* (2013.01); *G05D 1/0225* (2013.01); *G01S 7/4082* (2021.05); *G05D 2201/0213* (2013.01)

(58) Field of Classification Search
CPC ...................................................... G01S 7/497
See application file for complete search history.

(56) References Cited

U.S. PATENT DOCUMENTS

| | | | | |
|---|---|---|---|---|
| 5,977,906 A | * | 11/1999 | Ameen | G01S 13/931 342/174 |
| 7,280,931 B1 | * | 10/2007 | Kim | G05B 19/4184 700/286 |
| 9,659,502 B1 | * | 5/2017 | Abebe | G08G 5/0034 |
| 10,067,502 B1 | * | 9/2018 | Delp | G06Q 10/20 |
| 2007/0179690 A1 | | 8/2007 | Stewart | |
| 2010/0235129 A1 | | 9/2010 | Sharma | |
| 2012/0277952 A1 | * | 11/2012 | MacNeille | G01C 21/3453 701/36 |
| 2013/0325252 A1 | * | 12/2013 | Schommer | G01S 7/52004 701/33.1 |
| 2015/0081156 A1 | | 3/2015 | Trepagnier | |

(Continued)

OTHER PUBLICATIONS

International Search Report and Written Opinion for International Patent Application No. PCT/US2018/064679, dated Apr. 5, 2019.

*Primary Examiner* — Hyun D Park
(74) *Attorney, Agent, or Firm* — Baker Botts L.L.P.

(57) ABSTRACT

In one embodiment, a method includes receiving sensor data from one or more sensors of an autonomous vehicle (AV); determining that a first sensor of the one or more sensors needs recalibration based on the sensor data. The first sensor being of a first sensor type. The method also includes sending a request to a remote management system indicating that one or more of the sensors of the AV need recalibration and a location of the AV; determining the presence of a service vehicle having a calibration target configured to calibrate sensors of the first sensor type; and initiating a calibration routine using the calibration target.

20 Claims, 12 Drawing Sheets

(56) References Cited

U.S. PATENT DOCUMENTS

| | | | |
|---|---|---|---|
| 2016/0161602 A1* | 6/2016 | Prokhorov | G01S 13/865 |
| | | | 702/97 |
| 2016/0245899 A1 | 8/2016 | Rybski | |
| 2017/0278312 A1* | 9/2017 | Minster | G06Q 10/00 |
| 2018/0024571 A1* | 1/2018 | Peasgood | B64C 19/00 |
| | | | 244/7 C |
| 2019/0064320 A1* | 2/2019 | Zack | G01S 7/497 |

* cited by examiner

MOBILE SENSOR CALIBRATION

BACKGROUND

An autonomous vehicle (AV) may be a vehicle that is capable of sensing its environment and navigating with little to no human input. The autonomous vehicle may be equipped with a variety of systems or modules for enabling it to determine its surroundings and safely navigate to target destinations. For example, an autonomous vehicle may have an integrated computing system (e.g., one or more central processing units, graphical processing units, memory, and storage) for controlling various operations of the vehicle, such as driving and navigating. To that end, the computing system may process data from one or more sensor arrays. For example, an autonomous vehicle may have optical cameras for, e.g., recognizing roads and lane markings; infrared cameras for, e.g., night vision; LiDARs for, e.g., detecting 360° surroundings; RADAR for, e.g., detecting distant hazards; stereo vision for, e.g., spotting hazards such as pedestrians or tree branches; wheel sensors for, e.g., measuring velocity; ultra sound for, e.g., parking and obstacle detection; global positioning system (GPS) for, e.g., determining the vehicle's current geolocation; and/or inertial measurement units, accelerometers, gyroscopes, and/or odometer systems for movement or motion detection. Data from these systems and modules may be used by a navigation system to safely guide the autonomous vehicle, even without the aid of a human driver. The autonomous vehicle may also include communication devices for, e.g., wirelessly communicating with one or more servers, user devices (e.g., smartphones, tablet computers, smart wearable devices, laptop computers) and/or other vehicles.

Successful and safe navigation of an AV depends on having accurate data measurement and representation of the external environment at all times. Having accurate data or three-dimensional model of the external environment is, in turn, dependent at least in part on proper calibration of the AV's sensors, which may include knowing the initial configurations and/or conditions of the sensors and how objects or obstacles are detected by the sensors. To maintain an accurate representation or model of the external environment, the sensors of the AV may require periodic recalibration to ensure safe navigation of the AV. However, recalibration of the sensors can be a time-consuming process, especially given the numerous sensors that an AV may be equipped with. AVs are inoperable or taken offline while their sensors are being recalibrated, thereby reducing the utilization of the AVs and the capabilities of an AV management system. In addition, calibration of sensors may be a painstaking, manual process that requires specialized labor and increased costs of operation of the AVs.

DESCRIPTION OF EXAMPLE EMBODIMENTS

Figure 1:
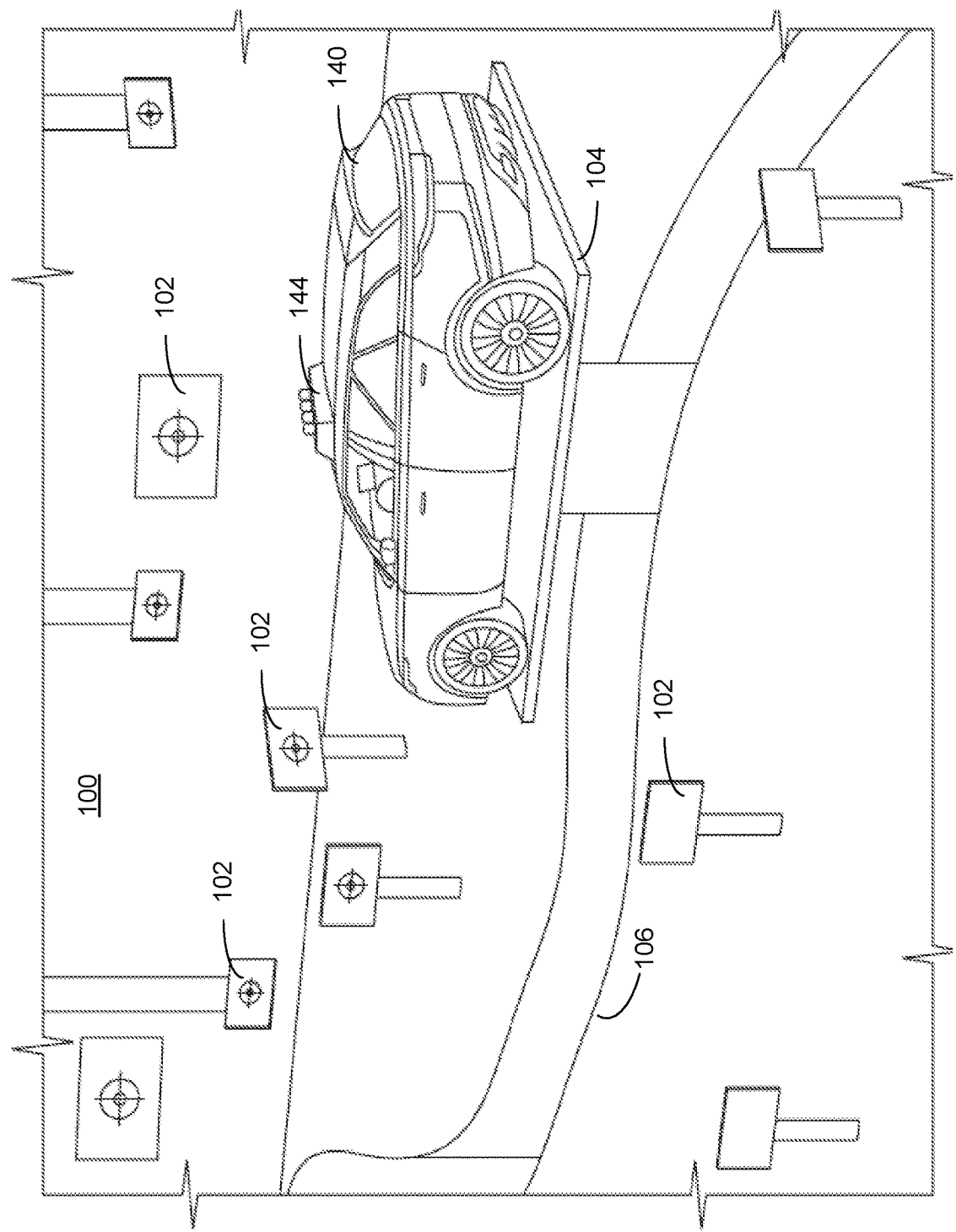
FIG. 1 illustrates an example sensor calibration facility.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described. In addition, the embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g., method, can be claimed in another claim category, e.g., system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

An autonomous vehicle (AV) may include one or more sensors of various and complementary types to capture information of the external environment of AV. Successful and safe navigation of an AV depends on having accurate data measurement and representation of the external environment at all times. Having accurate data or three-dimensional model of the external environment is, in turn, dependent at least in part on proper calibration of the AV's sensors, which may include knowing the initial configurations and/or conditions of the sensors and how objects or obstacles are detected by the sensors. In order to properly process data obtained by the sensors, a system my need to know the relationship between the sensor data and the position, orientation, and/or configuration of the sensors, since any misalignment, rotation, or translation of the sensors, if not properly accounted for, may prevent the generation of an accurate model that accurately represents the external environment of the AV or the ability of the AV to accurately perceive the external environment. As an example and not by way of limitation, the sensors of AV may shift from their proper positions due to vibration, wind, rain, collisions with other vehicles or objects, or driving over objects or potholes on the road. Given the importance of having properly calibrated AV sensors and the likely high frequency of calibration being needed (e.g., since AV sensors are exposed to the elements and moving at high speed with the AV), the time, resources, and opportunity cost of AV calibration may be significantly high, especially when multiplied by the number of AVs in a fleet.

Particular embodiments described herein relate to a service facility configured to facilitate AVs in self-calibrating the sensors of their sensor array. The service facility may include a number of calibration targets configured to concurrently calibrate multiple types of sensors. As described herein, the AV may be parked on a platform for AVs and/or guided along a path among the calibration targets while performing a self-calibration routine(s). As described herein, self-calibration may be performed during routine downtime, such as for example, while waiting in queue to enter the service facility or while the AV is being serviced within the service facility. Having a facility that enables an AV to calibrate multiple types of sensors concurrently while having other service done (e.g., refueling) improves the efficient use of the AV's offline time. By minimizing an AV's offline time, the AV's online time for servicing ride requestors may be maximized.

Guiding the AV over a pre-determined course of calibration targets may result in faster throughput in sensor calibration, especially since the calibration process may be performed with limited or no human intervention. Having calibration targets configured to facilitate concurrent calibration of multiple types of sensors may reduce the overall calibration time (e.g., calibrating sensors one after another in a serial fashion may require significantly longer calibration times). Performing sensor calibration during scheduled downtime (e.g., charging of batteries or maintenance) may result in higher utilization of AVs which removes the need to have a dedicated time for sensor calibration. In addition, the embodiments illustrated and described herein may result in more consistent calibration of the sensor array across a fleet of AVs and higher quality calibration data for establishing a statistical reference. Furthermore, the faster throughput from automating the calibration process may allow for calibration references to be obtained from a large sample size of AVs.

Particular embodiments described herein further relate to a mobile platform for facilitating AVs in self-calibrating their sensors. The sensors of the AV may need to be recalibrated while the AV is in the field. For example, in the case of an accident, one or more sensors of the AV may become misaligned thereby making continued autonomous navigation problematic. Instead of immediately shutting down or recalling the AV, it may be preferable to recalibrate the sensors in the field and have the AV continue operating since the AV may be brought back online more quickly without spending the time to go back to the service facility. In particular embodiments, the AV may park itself at the nearest safe location in response to determining that one or more sensors of its sensor array require recalibration. One or more service vehicles may be sent to the location of the AV to facilitate the AV performing sensor calibration in the "field." Once the recalibration is performed, the AV may resume normal operations (assuming the AV is safe to drive and/or has minimal damage due to the accident). Embodiments illustrated and described herein may result in higher utilization of AVs with reduced downtime since AVs may not need to be recalled or towed to a service facility when sensors require recalibration during operation. In addition, the embodiments illustrated and described herein may result in timely resolution of possibly dangerous situations by allowing an AV to resume safe navigation after detecting problems with the sensors of the sensor array.

Before describing particular embodiments for facilitating AV calibration, it may be helpful to describe how calibration may be achieved in accordance with particular embodiments. Software calibration is performed on the sensors to refine initial knowledge of the locations and orientations of the sensors, so that the data from the sensors are all measured with reference to the expected coordinate system. Each type of sensor may have a calibration algorithm that is unique to the particular type of sensor. In particular embodiments, calibration targets may be configured to calibrate multiple types of sensors of a sensor array. As an example and not by way of limitation, one or more calibration targets may have a calibration surface designed to calibrate both optical camera and LiDAR transceivers, so that a computing system of AV may determine how accurately the optical cameras and LiDAR of the sensor array are calibrated with respect to each other. As an example and not by way of limitation, a calibration issue may be detected if the orientation of a calibration surface as measured by the optical camera is different from the orientation measured by the LiDAR transceiver. As another example, a calibration issue may be detected if the distance to a calibration surface as measured by LiDAR is different from the distance measured by an ultrasound sensor. In particular embodiments, the model representing an AV's environment, described herein, is refined to optimize the accuracy of the model using statistical or direct error formulations. As an example and not by way of limitation, the optimization of sensors may be formulated using a cost function with a goal of minimizing the value of the cost function.

With respect to optical cameras, it should be noted that such cameras have internal characteristics, such as, its focal length, skew, distortion, and image center, as well as external characteristics, such as its position and orientation relative to a captured scene. For optical cameras, calibration may involve intrinsic and extrinsic calibration. Intrinsic calibration involves the calibration of the internal components of an optical camera including the lens to correct lens distortion of the incoming light to the principal point or optical center of the image sensor. Extrinsic calibration involves the calibration of the position (e.g., translation) or rotation (e.g., orientation) of the optical camera. Calibration of optical cameras may be performed using a bundle-adjustment algorithm and may be performed using unstructured images (e.g., a random scene) or specialized calibration targets. Example types of calibration targets for optical cameras of an AV may include checker-board patterns, color patterns (e.g., MacBeth chart) illuminated using a particular type of light source (for color calibration or lighting consistency), or a white screen positioned at a particular distance from the vehicle (e.g., for vignetting calibration). In particular embodiments, a service facility (e.g., sensor calibration facility) may include one or more projectors configured to project calibration targets on the walls of the facility. Targets may be projected onto walls or other parked AVs in the facility to allow calibration targets to be easily changed or moved during calibration.

In particular embodiments, known information about the calibration targets may be used to gauge or measure the accuracy of the optical cameras. As an example, reprojection error may be used as a metric for assessing accuracy. Conceptually, based on the known position and orientation of an optical camera relative to the known position of an actual point in the real world (e.g., a corner on a checkerboard pattern), a calibration system may compute an expected point on a two-dimensional plane (which may represent the focal plane of the optical camera) by projecting the actual point towards the camera and through the two-dimensional plane. The projected point may then be compared to the position of a captured image of the actual point; the distance between the two may be referred to as the reprojection error. Based on this error, the calibration system may measure how accurate the optical sensor is and, if desired, adjust how image data captured by the optical camera is translated to a three-dimensional model. To calibrate different image regions (e.g., the center, upper-left corner, etc. of an image), the optical camera may capture images of calibration targets at different positions so that the target appears in the regions of interest (similarly, the camera's position and/or orientation may change relative to the calibration target).

The orientation of optical cameras may be represented and/or captured in any suitable manner. For example, the orientation of the optical cameras may be represented a forward vector, right vector, and an up vector. The orientation may be stored by a computing system of the AV as these three vectors, a rotation matrix, or Euler angles. In particular embodiments, the model that includes where the optical cameras and other sensors are located and how they are oriented may be updated using the orientation information and reprojection error. Although this disclosure describes receiving sensor data in a particular manner, this disclosure contemplates receiving sensor data in any suitable manner.

For LiDAR transceivers, example calibration targets may include a flat or planar surface with a distribution of holes or voids (e.g., a "Swiss cheese" pattern), a depth map, or 3D objects (e.g., perpendicular corners or wall corner) for calibrating the depth measurements of a LiDAR transceiver. In particular embodiments, the geometry of the calibration targets may vary within a collection of calibration targets. For example, LiDAR transceivers may be calibrated using physical 3D objects with different contours or depths, such as three perpendicular planes used for forming a 3D corner (e.g., like a corner of a wall or a cut corner of a cube). Based on known information about the calibration targets (e.g., the targets' positions, orientations, geometry, etc.), deviations in the LiDAR's measurements may be determined and adjusted accordingly.

In particular embodiments, LiDARs may be calibrated using calibration targets with regions of reflective properties. The reflectivity of the material of the calibration targets may vary within a particular calibration target and LiDAR transceivers may be configured to detect the intensity of the laser as it is reflected from a surface. Since the laser from the LiDAR transceiver are reflected differently from regions of different reflectivity, the laser output captures a "visual" pattern that may be used for calibration of the LiDAR transceiver. As an example and not by way of limitation, a surface of a calibration target may include "regular" material (e.g., relatively medium reflective photon intensity), retro-reflective material (e.g., relatively high reflective photon intensity), mirrors (e.g., relatively low reflective photon intensity), or any combination thereof. The different or varying reflective surface of the calibration targets create a "visual" pattern to the LiDAR transceivers to output a LiDAR surface map. Based on the known or expected visual pattern and the detected visual pattern, deviations in the LiDAR's measurements may be determined and adjusted accordingly.

In particular embodiments, calibration targets may incorporate different features to calibrate multiple types of sensors (e.g., optical cameras and LiDARs). As an example and not by way of limitation, the calibration targets may have a surface with visual patterns for calibrating optical cameras and regions of varying reflectivity material for calibrating LiDAR transceivers. In particular embodiments, a calibration target for calibrating multiple types of sensors may be a cube, hexagonal or tetrahedral volume, any of which may have regions of varying reflective properties (for LiDAR calibration) and visible patterns (for optical-camera calibration) on each side of the 3D volume. Although this disclosure describes calibration targets that are configured to calibrate a particular combination of types of sensors, this disclosure contemplates calibration targets that are configured to calibrate any suitable combination of sensor types. By exposing multiple types of calibration targets simultaneously to an AV's sensors, the AV may simultaneously calibrate multiple types of sensors, thereby reducing the total amount of calibration time.

In particular embodiments, calibration of individual sensors may be based on statistical calibration data obtained from a fleet of AVs. For example, statistical calibration data may be used to address inaccurate assumptions made by imaging algorithms. Such imaging algorithms may be based on a mathematical model, where image sensors may be modeled as a point. This theoretical representation, however, does not reflect the actual world, since, for example, an optical camera has a body, lenses, and an image sensor. Because of this, images taken by an optical camera may consistently deviate from what the mathematical model expects. In particular embodiments, calibration data of a large number of the AVs having a substantially similar sensor array may be used to establish a data-based reference point that may be used to compensate for deviations in measurements. As an example and not by way of limitation, rather than using a mathematically defined origin as the vantage point (e.g., a point in space representing a pin-hole camera), the actual vantage point of a physical camera may be a fixed distance (e.g., 3 cm) from the origin. Calibration parameters derived from the collective data of the AVs may accurately reflect what may be expected in the field or outside of a factory. This may be used as a benchmark for newly calibrated vehicles (in cases where the benchmark is generated based on data gathered by such vehicles) and used to determine calibration deterioration.

FIG. 1 illustrates an example calibration facility. An AV 140 may include one or more sensors of various types in a sensor array to capture information of the external environment of AV 140. Although sensor array 144 is illustrated in a particular location on AV 140 in FIG. 1, sensor array 144 may be located in any suitable location in or on AV 140. Example locations for sensors include the front and rear bumpers, the doors, the front windshield, on the side paneling, or any other suitable location of AV 140. In particular embodiments, a navigation system of AV 140 may be any suitable autonomous navigation system, such as for example a navigation system based at least in part on a Global Positioning System (GPS) module, inertial measurement unit (IMU), light detection and ranging (LiDAR) transceivers, optical cameras, radio-frequency (RF) transceivers, ultrasonic sensors, or any other suitable data gathering mechanism. While AV 140 is being operated, AV 140 may share data (e.g. sensor data, navigation data) with a ride-service system. Autonomous-vehicle sensor data may be captured by any suitable sensor arrangement or array.

In particular embodiments, a computing device associated with autonomous vehicle 140 may receive autonomous-vehicle sensor data that represents an external environment within a threshold distance of autonomous vehicle 140. In particular embodiments, the computing device may be a ride-service computing device, navigation system, or may be any other suitable computing device associated with AV 140. The autonomous-vehicle sensor data may be collected via sensors arranged on the outside or the inside of AV 140. The autonomous-vehicle sensor data may enable autonomous vehicle 140 to identify objects in the surrounding external environment, such as other vehicles, obstacles, traffic signage, cyclists, or pedestrians.

In particular embodiments, the autonomous-vehicle sensor data may represent a three-dimensional schema of the external environment of AV 140. As an example and not by way of limitation, the three-dimensional schema may represent the external environment including objects such as for example other cars and pedestrians up to a maximum range of the sensor array 144 (e.g. 100 meters). In particular embodiments, at least some of the autonomous-vehicle sensor data may be labeled to include references to objects that are within a threshold distance from AV 140. The autonomous-vehicle sensor data may further enable autonomous vehicle 140 to identify the road upon which it is driving, lanes in the road, or any other suitable object.

In particular embodiments, sensor array 144 on AV 140 may include optical cameras. Optical cameras may include an image sensor that is configured to capture individual photo images or a series of images as a video. As an example and not by way of limitation, the optical camera may include a charge-coupled device (CCD) image sensor or a complementary metal-oxide-semiconductor (CMOS) active-pixel image sensor. In particular embodiments, the optical camera may include a lens or lens assembly to collect and focus incoming light onto the focal area of the image sensor. As an example and not by way of limitation, the optical camera may include a fisheye lens, ultra-wide-angle lens, wide-angle lens, or normal lens to focus light onto the image sensor. Although this disclosure describes and illustrates particular optical cameras having particular image sensors and particular lenses, this disclosure contemplates any suitable optical cameras having any suitable image sensors and any suitable lenses.

In particular embodiments, the sensors on autonomous vehicle 140 may include a LiDAR transceiver, where in particular embodiments, multiple LiDAR transceivers are configured to rotate 360° around the autonomous vehicle. The LiDAR transceiver may include LiDAR transceivers that rotate 360°. The LiDAR transceiver may transmit laser beams in multiple directions within a distance around autonomous vehicle 140, which may be the range of the sensors. In particular embodiments, LiDAR transmitting signals may be steered by use of a gated light valve, which may be a micro-electro-mechanical systems (MEMS) device that directs a light beam based on the principle of light diffraction. Such a solid-state device may not use a gimbaled mirror to steer light beams in 360° around AV 140. Rather, a gated-light valve may direct the light beam into one of several optical fibers, which may be arranged such that the light beam is directed to many discrete positions around AV 140. Thus, environmental data may be captured in 360° around AV 140, but no rotating parts may be necessary.

Differences in laser return times and wavelengths may then be used to obtain coordinate information associated with the external environment of AV 140. In particular embodiments, the coordinate information may include distance information. The coordinate information may include a list of coordinate points (e.g. x, y, z coordinates) that represent locations where a laser from a LiDAR transceiver hit the surface of an object and was reflected back to AV 140. In particular embodiments, based on the coordinate information, a three-dimensional representation or model may be generated for autonomous navigation by AV 140. In particular embodiments, the coordinate points may also include a time component t which may represent the time that the laser was transmitted from the LiDAR transceivers, hit an object, or was received by the transceivers.

AV 140 may use the time component of the coordinate points to determine a real-time model of its external environment. In particular embodiments, autonomous vehicle 140 may combine the autonomous-vehicle sensor data from multiple types of sensors with other types of data to detect roadways, buildings, traffic signs, and other objects. The other types of data may include data acquired from third parties. Examples of other types of data acquired from third parties include map data, traffic data, weather data, ratings data (e.g. from an online review website or another third-party ratings entity) or any other suitable type of data. Although this disclosure describes receiving sensor data in a particular manner, this disclosure contemplates receiving sensor data in any suitable manner.

In particular embodiments, calibration facility 100 may be a facility dedicated to calibrating sensors of sensor array 144. Calibration facility 100 may include numerous calibration targets 102 that allow a vehicle to calibrate one or more of its sensors. As an example and not by way of limitation, calibration facility 100 may have a room or a track 106 with a variety of calibration targets 102 enabling AV 140 to simultaneously calibrate the sensors (e.g., optical cameras and LiDAR transceiver) of sensor array 144. In particular embodiments, AV 140 may be placed on a platform 104 for transporting AV 140 into one or more pre-determined positions relative to calibration targets 102. As an example and not by way of limitation, platform 104 may be configured to rotate, elevate, and/or move AV 140 along a path defined by a track 106, as well as laterally side to side, to position sensor array 144 at different vantage points to calibration targets 102. As an example and not by way of limitation, the path defined by track 106 may move to various positions within calibration facility 100 to position sensor array 144 in range of a particular set of calibration targets 102. At each pre-defined position, the particular set of calibration targets may be carefully laid out to facilitate a portion of the calibration routine when AV 140 is at a particular position, orientation, distance from each set of calibration targets 102. As described above, platform 104 may be configured to move AV 140 laterally, vertically, and angularly to properly and precisely orient sensor array 144 relative to the particular set of calibration targets 102. Calibration targets 102 may be placed throughout calibration facility 100 so that AV 140 may collect calibration data as it drives or is transported on platform 104 through calibration facility 100. For example, calibration targets 102 for camera calibration (e.g., checkerboard pattern) and LiDAR calibration (e.g., different 3D geometric shapes) may be held in place by rods hanging from the ceiling at different heights or orientation relative to track 106. In particular embodiments, calibration targets 102 may occupy a substantial portion of the space outside the path of movement defined by track 106.

In particular embodiments, calibration facility 100 may further include a number of service stations or bays. As an example and not by way of limitation, these service stations may include a charging/fueling station, cleaning station, or tire changing/rotation station. The path defined by track 106 may move AVs 140 using platform 104 from one service station to the next. In particular embodiments, while AV 140 is transported along track 106 from station to station, platform 104 may occasionally pause at pre-determined locations to concurrently calibrate its sensors. Although this disclosure describes a calibration facility with particular service stations, this disclosure contemplates a calibration facility that includes any suitable service stations and in any suitable order or sequence.

Figure 2:
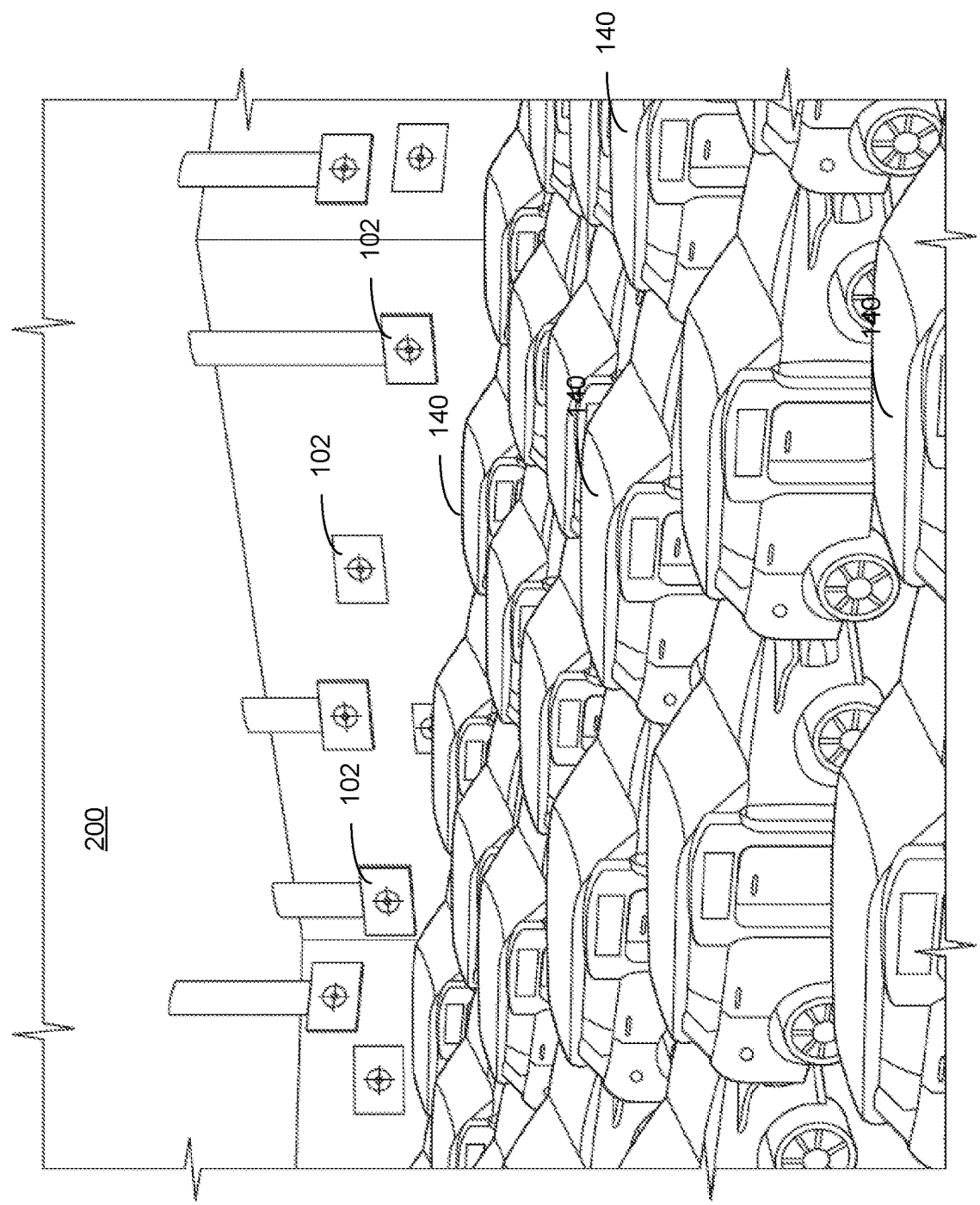
FIG. 2 illustrates an example service facility with calibration targets.

FIG. 2A illustrates an example service facility with calibration targets. In other embodiments, service facility 200 may also provide other services for AV 140, such as for example services such as for example charging/refueling (depending on whether AV 140 is an electric or internal combustion vehicle) or maintenance of AV 140. Although this disclosure describes and illustrates a particular service facility configured to provide particular services for autonomous vehicles, this disclosure contemplates any suitable facility providing any suitable function for autonomous vehicles. Service facility 200 may be configured with a space equipped with a number of charging stations for charging multiple AVs 140. In particular embodiments, this space may include calibration targets 102 fixed in position through the use of rods. As an example and not by way of limitation, calibration targets 102 may be target for optical camera calibration (e.g., checkerboard pattern) and LiDAR calibration (e.g., different 3D geometric shapes) held in place by rods hanging from the ceiling at different heights or orientations throughout the space. extrinsic calibration, however, we need to have a few trihedral targets at very well-specified locations (for radars). In particular embodiments, IMUS may be calibrated by cross-checking the IMU of the sensor array with a well-calibrated reference IMU.

In other embodiments, service facility 200 may include one or more projectors to project calibration targets 102 on to one or more walls of service facility 200. A flat wall of service facility 200 may be covered with projected LiDAR calibration targets 102. The projected LiDAR calibration targets 102 may be arranged randomly, or in a regular pattern. As illustrated in the example of FIG. 1, AV 140, or maybe just the sensor array 144 may be placed on a rotating platform 104 next to the wall. As platform 104 spins around and sensor array 144 collects images and LIDAR point clouds. The collected images and LIDAR point clouds are sent to the calibration software and the calibration software may use the data to solve for the extrinsic calibration parameters for both optical cameras and LIDAR of sensor array 144. As an example and not by way of limitation, AVs 140 being charged or serviced in service facility 200 may perform calibration of their respective sensor arrays 144 while service or charging is being performed or while the AV is performing any other type of operation (e.g., uploading telemetry and any type of gathered data). As another example, AVs 140 parked in a service facility may use each other as calibration targets. For example, an appropriate calibration target may be integrated into the exteriors (e.g., removable or painted calibration targets on the roof or side of parked AVs 140) of AVs 140. Further, leveraging the cameras and other sensors of the vehicles being serviced, the service facility may instruct the vehicles to inspect each other's exterior to identify vehicles that need to be washed or repaired.

Figure 3A:
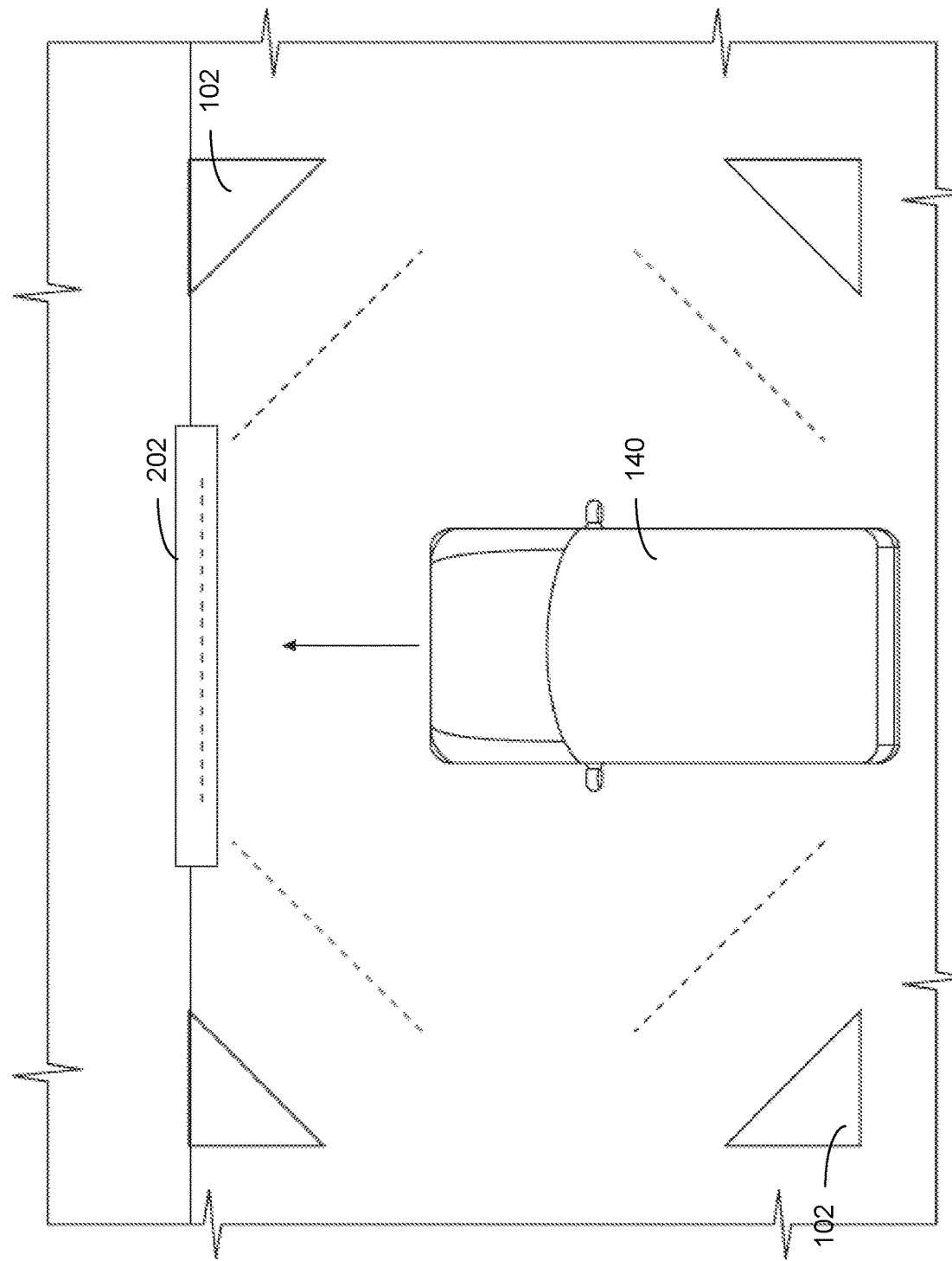
FIGS. 3A-B illustrate an example entryway to a service facility.
Figure 3B:
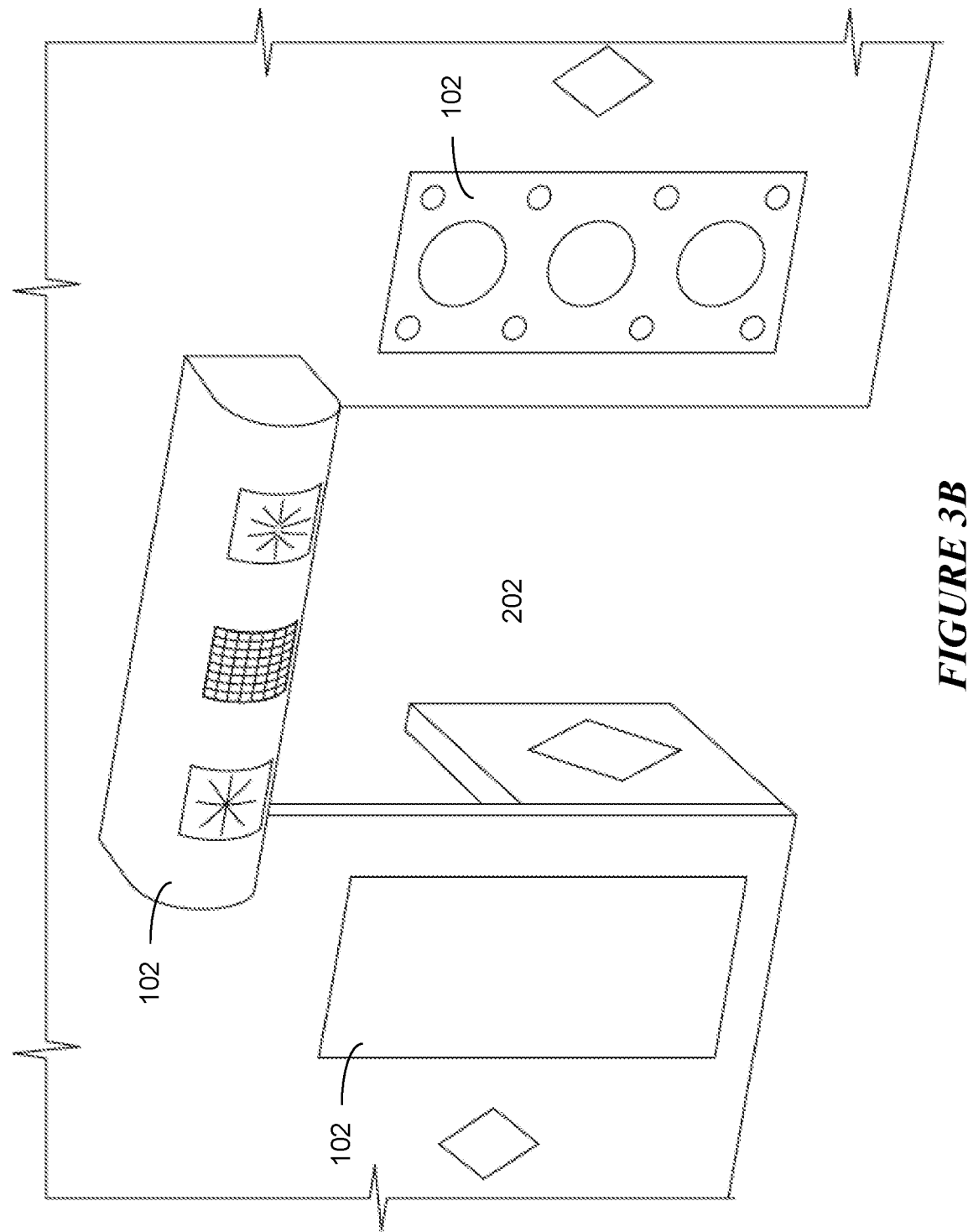

FIGS. 3A-B illustrate an example entryway to a service facility. FIG. 3A illustrates a plan view of the space around an entryway (or exit way) 202 to an AV facility that includes calibration targets 102 for calibrating the sensors of sensor array 144. AVs 140 may be programmed to return to the AV facility at pre-determined periods of time (e.g., every 10 hours or once a week) for routine maintenance or recharging/refueling. Depending on the number of AVs 140 that are supported by a particular AV facility, AVs 140 may queue at an entryway waiting to enter (or exit) AV facility 300, as illustrated in the example of FIG. 3A. FIG. 3B illustrates a perspective view of the space around an entryway 202 to an AV facility. In particular embodiments, AVs 140 in a waiting queue to enter the AV facility may determine or receive information of its orientation and distance from calibration targets 102 arranged on the walls of entryway 202, as illustrated in the example of FIG. 3B. AVs 140 may use the information of its orientation and distance from calibration targets 102 to initiate a calibration routine to calibrate its sensor array 144 while AVs 140 are in the queue.

As described above, example types of calibration targets 102 for optical cameras that may be projected onto walls of entryway 202 include checker-board patterns, color patterns illuminated using a particular type of light source, or a white screen positioned at a particular distance from the vehicle. Example types of LiDAR calibration targets 102 on the walls of entryway 202 may include physical 3D objects with different contours or depths, such as three perpendicular planes used for forming a 3D corner (e.g., like a corner of a wall or a cut corner of a cube. As described above, other example types of LiDAR calibration targets 102 may include a surface of a calibration target may include "regular" material (e.g., relatively medium reflective photon intensity), retro-reflective material (e.g., relatively high reflective photon intensity), or mirrors. Sensor array 144 may collect images and LIDAR point clouds from calibration targets 102 projected onto walls of entryway 202. These collected images and LIDAR data is sent to the calibration software and the calibration software solves for the extrinsic calibration parameters for both optical cameras and LIDAR of sensor array 144. Although this disclosure illustrates and describes facilities that are configured in a particular manner, this disclosure contemplates any suitable facilities for AV that are configured in any suitable manner.

Figure 4:
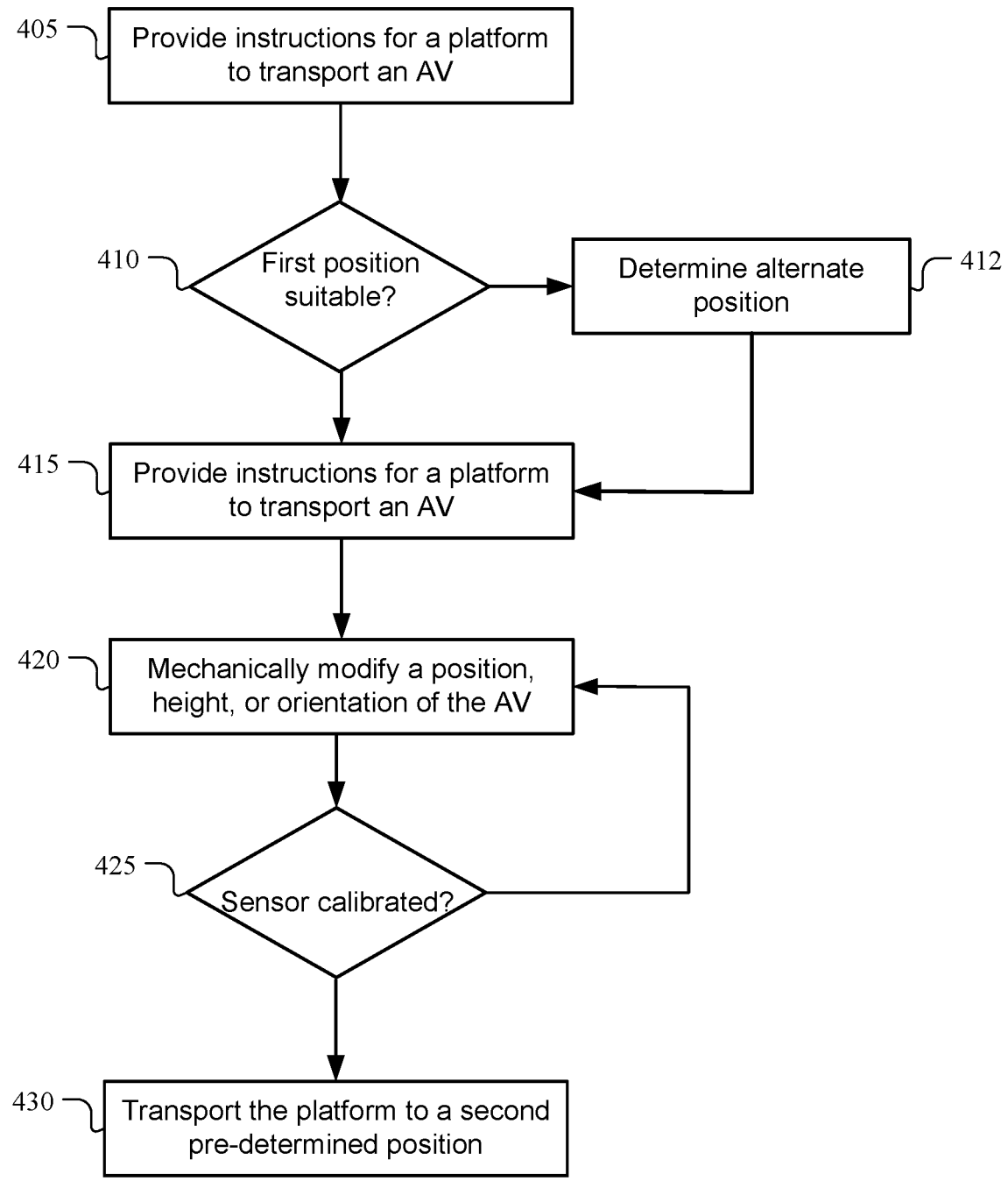
FIG. 4 illustrates an example of a method for instructing a platform in a service facility.

FIG. 4 illustrates an example method for instructing a platform in a service facility. In particular embodiments, the platform may be on a track that moves along a pre-determined path within the AV facility. The platform may move the AV between pre-determined positions defined by the pre-determined path. The method may begin at step 405, where the computing system determines the type of AV/sensor array and determines different calibration paths based on the make, model, manufacturer of AV/sensor array. At step 410, the computing system determines whether a first pre-determined position is suitable for calibrating the sensor array of the AV. At step 412, the computing system may determine an alternate position for the AV if the first pre-determined position is unsuitable. At step 415, a computing system of a service facility (e.g., calibration facility 200), provides instructions for a platform to transport an AV, supported by the platform, to a first pre-determined position relative to one or more of a number of calibration targets configured to be measured by and used for calibrating an optical camera and a LiDAR transceiver of the AV. In particular embodiments, the computing system of the service facility may receive information from sensors embedded in track 106 that indicates the position of platform 104 at a given time. As an example and not by way of limitation, light-emitting diode (LED) position sensor may detect when platform 104 has moved to the first pre-determined position relative to a set of calibration targets 102.

At step 420, the computing system provides instructions to mechanically modify a lateral position, height, or orientation of the AV in to a position to detect the calibration targets using the optical camera and LiDAR transceiver. In particular embodiments, platform 104 may include level sensors to determine the pitch and roll of platform 104, as well as sensors to determine the elevation of platform 104. Motors of platform 104 may move AV 140 into a particular position relative to calibration targets 102. In particular embodiments, computing system of AV 140 may receive information that platform 104 is at the first pre-determined location and has completed positioning AV 140. The computing system of AV 140 may initiate a calibration routine in response to receiving the information that platform 104 has completed positioning of AV 140. At step 425, the computing system communicates with the AV to determine whether the sensor has been calibrated at the first pre-determined position prior to transporting the AV to a second pre-determined position for the next step in calibrating the sensors. In particular embodiments, the computing system of the service facility may determine the sensor has not be calibrated and adjust the positioning of AV 140 relative to calibration targets 102 at the first pre-determined position when receiving information from the computing system of AV 140 that the confidence score is below a threshold value.

At step 430, the computing system provides instructions to transport the platform to a second pre-determined position. Particular embodiments may repeat one or more steps of the method of FIG. 4, where appropriate. Although this disclosure describes and illustrates particular steps of the method of FIG. 4 as occurring in a particular order, this disclosure contemplates any suitable steps of the method of FIG. 4 occurring in any suitable order. Moreover, although this disclosure describes and illustrates an example method for calibrating sensors of an AV in an AV facility including the particular steps of the method of FIG. 4, this disclosure contemplates any suitable method for calibrating sensors of an AV in an AV facility including any suitable steps, which may include all, some, or none of the steps of the method of FIG. 4, where appropriate. Furthermore, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

Figure 5:
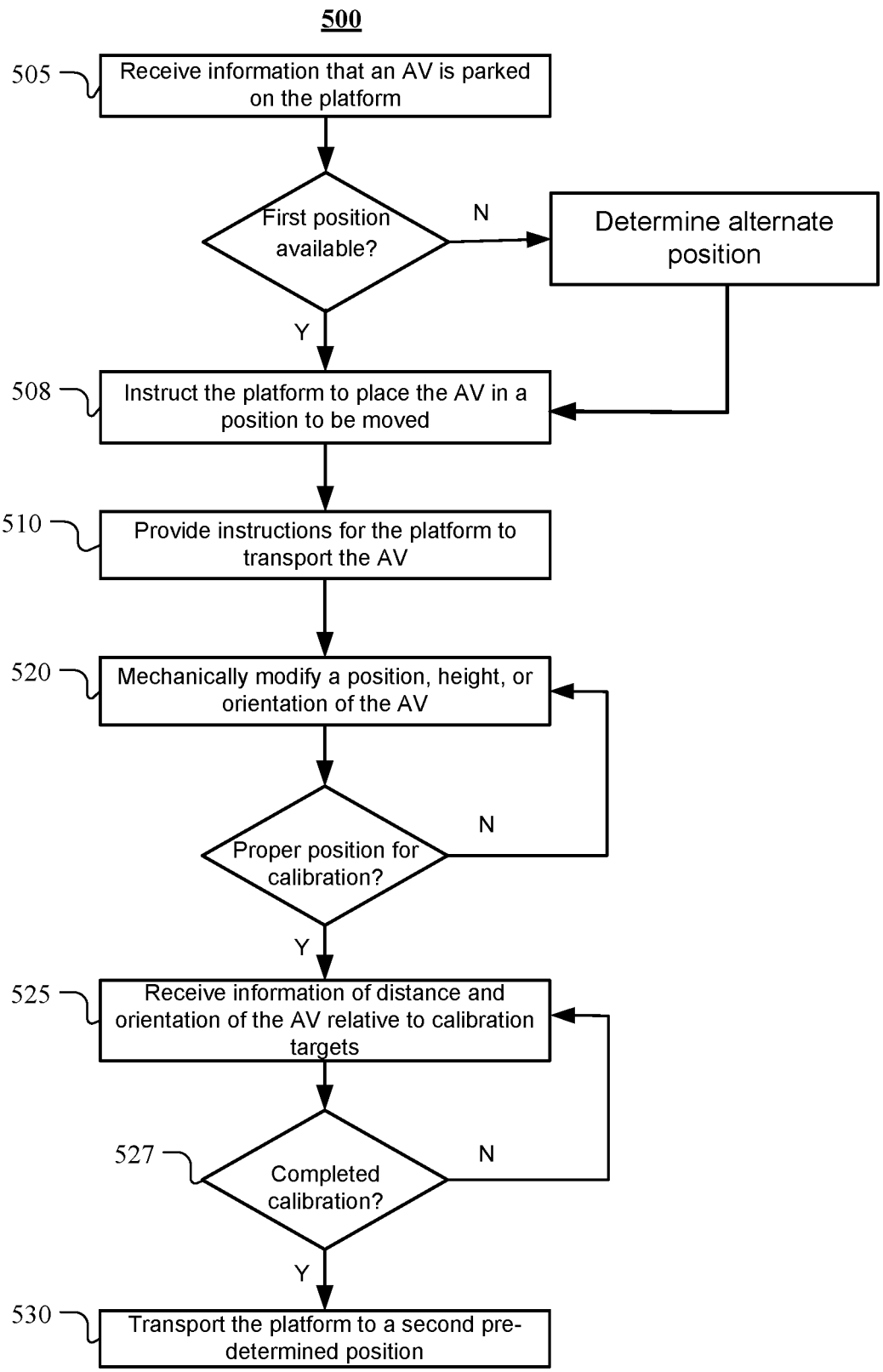
FIG. 5 illustrates an example of a second method for instructing a platform in a service facility.

FIG. 5 illustrates a second example method for instructing a platform in a service facility. The method may begin at step 505, a computing system of a service facility may receive information that an AV is parked on the platform. In particular embodiments, platform 104 may include one or more pressure sensors. Data from these pressure sensors may provide information to the computing system of the service facility that AV 140 is parked on platform 104. At step 506, the computing system may determine whether a first pre-determined position for calibrating sensors of the AV is available and includes calibration targets that are appropriate for the sensors of the AV. At step 507, the computing system may determine an alternate position for the AV if the first pre-determined position is unsuitable. In particular embodiments, the computing system may instruct the vehicle where in the service facility to go or when to move based on the available positions for sensor calibration. At step 508, the computing system may instruct the platform to place the AV in a position to be moved. In particular embodiments, platform 104 may be raised to a pre-determined elevation to travel along track 106. At step 510, a computing device of the AV facility may provide instructions to transport the AV, supported by the platform, to a first pre-determined position relative to one or more of a number of calibration targets. In particular embodiments, the calibration targets are configured to be measured by and used for calibrating an optical camera and a LiDAR transceiver of the AV. At step 520, a lateral position, height, or orientation of the AV is mechanically modified to a position to detect the calibration targets using the optical camera and LiDAR transceiver.

In particular embodiments, the computing system of the AV may instruct the sensors to detect any objects in proximity to the AV. At step 522, the computing system of the service facility may determine whether the AV is in proper position for calibration based on data received from the AV. At step 525, the computing system of the AV facility may receive information indicating the distance and orientation of the AV relative to the calibration targets at the first pre-determined position. At step 527, the computing system of the AV facility may determine whether the AV has completed calibration of its sensor array at the first pre-determined position. In particular embodiments, the computing system of the AV may send the information that the calibration is completed at the first pre-determined location when the confidence score of the sensor exceeds a certain threshold. At step 530, the platform may then be transported to a second pre-determined position. In particular embodiments, the computing system of the service facility may instruct the platform to move through the pre-determined positions relative to the calibration targets when receiving information that the calibration routine is completed at the respective pre-determined location.

As described above, the platform may be attached to a track that defines a path within the AV facility and the platform is moved to a number of pre-determined positions within the AV facility to complete the calibration of the sensors of the AV sensor array. Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method for calibrating sensors of an AV in an AV facility including the particular steps of the method of FIG. 5, this disclosure contemplates any suitable method for calibrating sensors of an AV in an AV facility including any suitable steps, which may include all, some, or none of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Figure 6A:
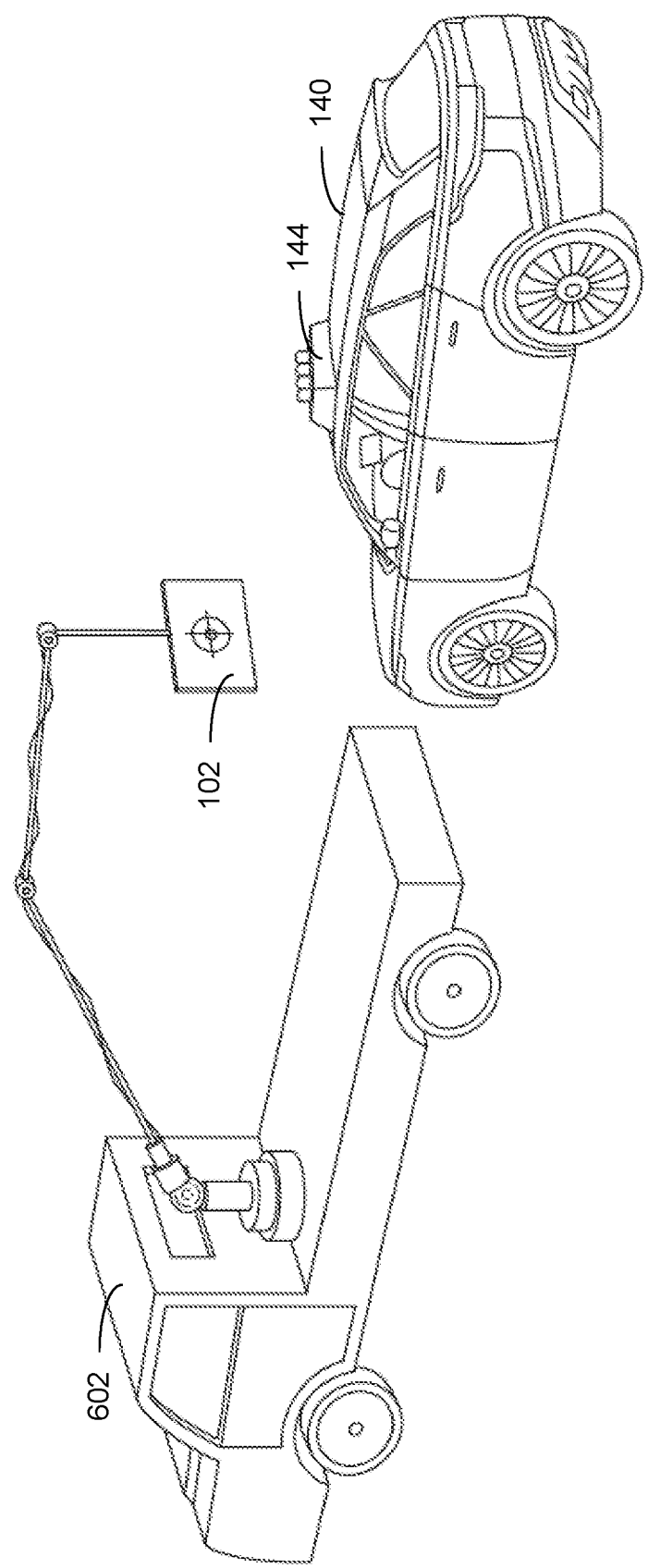
FIG. 6A illustrates an example service vehicle with a calibration target.

FIG. 6A illustrates an example service vehicle with a calibration target. Calibration issues of sensors of sensor array 144 may be detected while AV 140 is in the field. As described above, sensor array 144 of AVs 140 may become misaligned or moved out of position while AV 140 is being operated. After AV 140 has been initially calibrated at a facility, a computing system of AV 140 may store a calibration reference of how properly calibrated sensors for the AV should behave and/or perceive information. Periodic in-field measurements of sensors of sensor array 144 may be compared to the calibration reference to determine whether recalibration of sensor array 144 is necessary. As an example and not by way of limitation, AV 140 may store the calibration reference (or difference) between images captured by two of its properly calibrated optical cameras of sensor array 144. While AV 140 is operated, if the difference between images captured by the two optical cameras exceeds a certain threshold beyond the calibration reference (e.g., corresponding objects captured by the two cameras are 5 pixels off rather than 1 pixel off), a computing system of AV 140 may determine that recalibration is needed. Other metrics (e.g., reprojection error) may also be used to indicate when sensor array 144 of AV 140 needs recalibration.

If a confidence score (e.g., based on reprojection error) of sensors of sensor array 144 falls below a first threshold, a computing system of AV 140 may attempt to re-calibrate itself based on arbitrary surroundings, and may escalate to requesting a service vehicle 602 if the recalibration based on arbitrary surroundings does not produce sufficiently accurate results. AV 140 may not stop in response to determining a calibration issue, and instead automatically perform sensor recalibration based on the surroundings without interruption to driving. In particular embodiments, the confidence score may be based on detecting a point X in the environment of the AV as being at a pixel location A in an image from a first optical camera and at a pixel location B in an image from a second optical camera. Given a calibrated camera array, the two pixel coordinates (A and B) may be used to triangulate a 3-D coordinate of the point in the environment. Using the calibrated models, as described above, point X is projected back into the images from the first and second optical cameras, resulting in translated pixel coordinates A' and B', respectively. The reprojection error that is calculated for two optical cameras using the pixel coordinates from images obtained from the same scene may be approximated by the following equation:

$$\text{Reprojection Error} = \frac{1}{2} \times \|A - A'\|^2 + \frac{1}{2} \times \|B - B'\|^2 \quad (1)$$

A value of reprojection error larger than 1 may a sensor calibration issue. In some cases, a high value of the reprojection error may be an outlier caused by a high mismatch in pixel locations in the images from the first and second optical cameras (e.g., pixel location A does not correspond to the same point in the environment as pixel location B). In particular embodiments, a distribution of reprojection errors may be calculated a relatively large number of points in the environment. If only 10% of the matches between the different points in the environment and the corresponding point locations in the images of the first and second optical cameras are correct, then the value of the 10th percentile of reprojection errors should be less than 1.

If a confidence score of sensors of sensor array 144 falls below a second threshold (e.g., lower than the first threshold), a computing system of AV 140 may signal a fleet management system, described below, indicating sensor array 144 needs to be recalibrated. In particular embodiments, a computing system of AV 140 may drive AV 140 to the side of a road or other safe location in response to determining that the sensors of sensor array 144 need to be recalibrated. The fleet management system may dispatch a service vehicle 602 to the location of AV 140. As an example and not by way of limitation, service vehicle 602 may also be an autonomous vehicle. In particular embodiments, the service vehicle is selected by the remote management system based on the type of sensor to be recalibrated, a threshold distance from the AV, a status of the service vehicle, etc. As an example and not by way of limitation, the determination of whether to match with a particular service vehicle 602 or to recall the AV to a service facility may be based on whether service vehicle 602 is closer to the AV than the distance from the location of the AV to the nearest service facility. Service vehicle 602 may have an extendable mechanical device (e.g., robotic arm) that is configured to hold and move calibration targets 102 at pre-determined distances and orientations relative to the sensors of sensor array 144. As described above, calibration targets 102 may be configured to facilitate calibration of multiple types of sensors (e.g., optical cameras and LiDAR).

In particular embodiments, a computing system of service vehicle 602 may send information to a computing system of AV 140 indicating the presence of service vehicle 602 and the position of service vehicle 602 (e.g., distance and orientation) relative to AV 140. As an example and not by way of limitation, the "ground truth" (e.g. its distance and orientation relative to AV 140) of calibration target 102 may be communicated from the service vehicle to a computing system of AV 140 using an accurate GPS to indicate the location of the vehicle or the extension distance and degrees of rotation of the robotic arm holding the calibration target. In particular embodiments, optical cameras of sensor array 144 may be used to determine the orientation and distance of calibration target 102 held by the robotic arm of service vehicle 602 and refine the ground truth data. In particular embodiments, the computing device of AV 140 may receive information from service vehicle 602 that the robotic arm is in position for AV 140 to calibrate its sensor array 144.

In particular embodiments, a computing system of service vehicle 602 may move the robotic arm in a prescribed path around sensor array 144 of AV 140. As an example and not by way of limitation, the robotic arm may move calibration target 102 in a spiral path about sensor array 144. In other examples, the robotic arm may move calibration target 102 in a zig-zag or randomized path in front of or around the sensor array. Although this disclosure describes moving a calibration target in particular types of paths, this disclosure contemplates moving a calibration target in any suitable path. The computing system of AV 140 may receive an indication that calibration target 102 of the service vehicle is ready for use and in a position where calibration target 102 may be detected by sensors (e.g., optical camera and LiDAR) of sensor array 144. In particular embodiments, AV 140 may initiate a sensor calibration routine to calibrate the sensors of sensor array 144 in response to receiving the data that calibration target 102 is ready for use. In particular embodiments, the computing system of AV 140 may receive data indicating that a robotic arm of service vehicle 602 holding calibration target 102 has moved to a calibration position relative to AV 140. The computing system of AV 140 may initiate and complete the calibration routine in response to receiving the data that calibration target 102 has moved into the calibration position. In particular embodiments, the computing system of AV 140 may send data informing a remote management system or a computing system associated with service vehicle 602 that calibration has been completed by AV 140. In other embodiments, AV's 140 calibration software may estimate the position of calibration target 102 whether calibration target 102 is held by a robotic arm on the service vehicle or service vehicle 602 (e.g., a drone).

In particular embodiments, service vehicle 602 may include a mobile calibration platform configured to calibrate the sensors of sensor array 144. The entire sensor array 144 holding the sensors (e.g., a bracket assembly to which sensors are affixed) may be removed from AV 140 and placed in the mobile calibration platform. The mobile calibration platform may be a room, platform, or pod transported on the back of service vehicle 602 with a number of calibration targets to calibrate sensors of sensor array 144. As an example and not by way of limitation, sensor array 144 may be placed on a platform that may be rotated and moved around in the mobile calibration platform until calibration routine is complete (the calibration targets may also move and change configurations relative to the platform). Once the sensors have been recalibrated, sensor array 144 may be returned to and mounted in place on AV 140. In particular embodiments, service vehicle 602 may swap sensor array 144 of AV 140 with a recently calibrated sensor array.

Figure 6B:
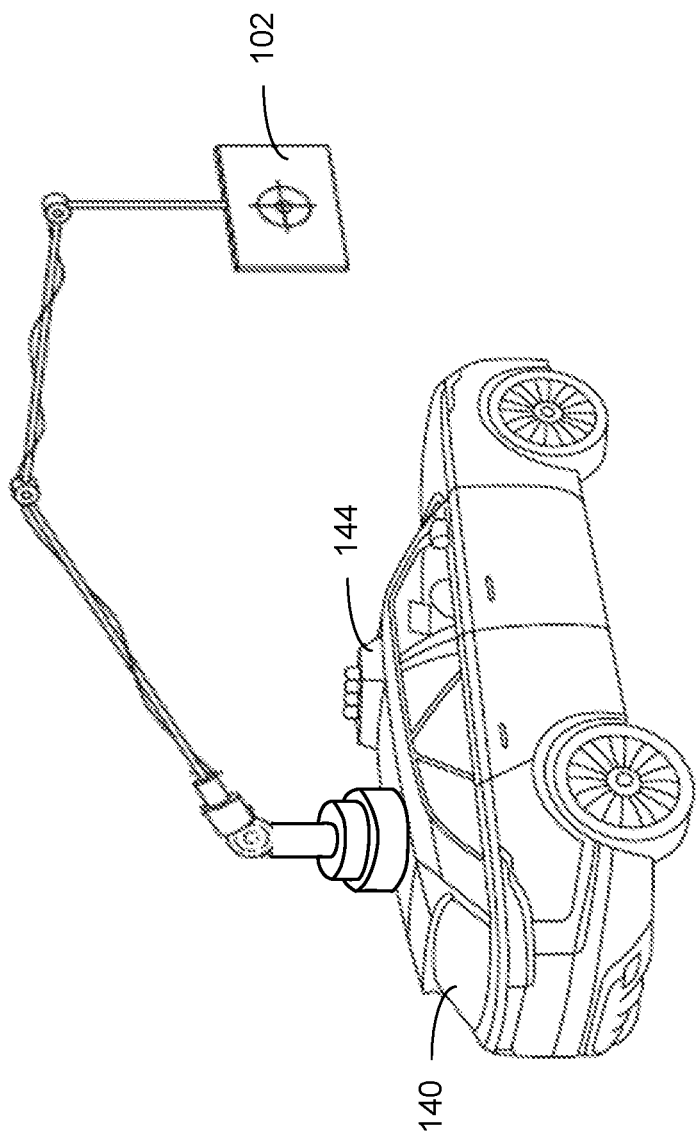
FIG. 6B illustrates an example AV with a calibration target.

FIG. 6B illustrates an example AV with a calibration target. In particular embodiments, AV 140 may be configured with a calibration device on the roof or in the trunk space, such as a robotic arm. As described above, the robotic arm may be configured to hold calibration target 102 at a calibration position relative to sensor array 144. In particular embodiments, a computing system of AV 140 may move the robotic arm in a prescribed path around sensor array 144. Once the calibration routine is completed, the robotic arm may be retracted and AV 140 may resume normal operations. While FIG. 6B illustrates a single robotic arm, any number of robotic arms or other devices for holding calibration targets may similarly be attached to the AV 140. Further, while a mobile robotic arm is illustrated, the calibration device may include any other extendable and/or rotatable device for holding and moving calibration targets. In particular embodiments, the calibration device may be transported by a service vehicle and brought to AV 140 when needed. For example, the service vehicle and AV 140 needing calibration may be instructed to meet at a particular location. Once both the service vehicle and AV 140 are at the designated location, a technician may mount the calibration device on AV 140. In particular embodiments, the calibration device may be attached to a base with mounting guides configured to fit a corresponding mounting location on AV 140 (e.g., on the hood or top cover). The preconfigured mounting base and mounting location may ensure that the relative positions and orientations between the calibration target held by the calibration device and the AV's sensors are consistent and as expected. Once calibration is complete, the calibration device may be removed from AV 140 and transported by the service vehicle to another AV 140 needing calibration.

Figure 7:
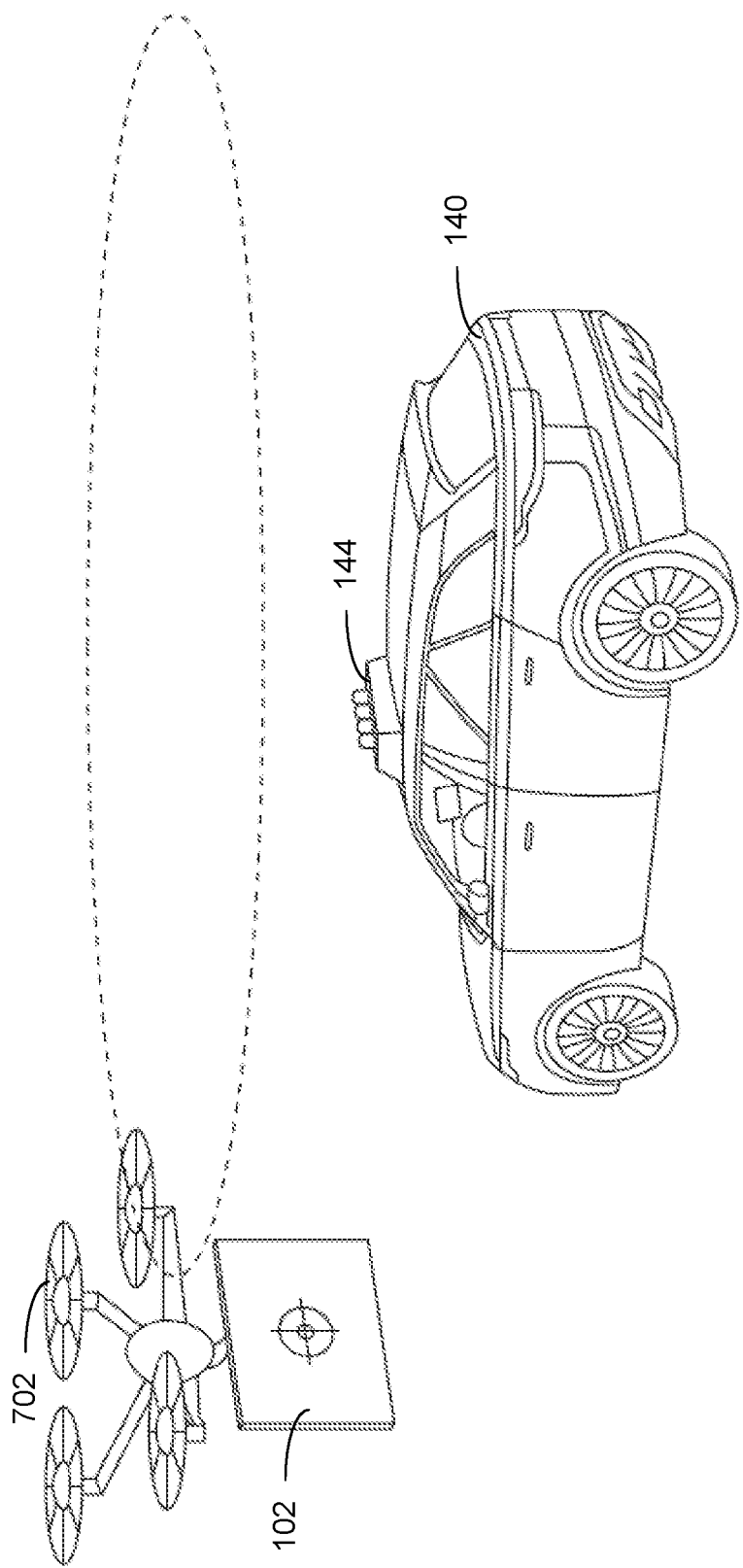
FIG. 7 illustrates an example drone with a calibration target.

FIG. 7 illustrates an example drone with a calibration target. In particular embodiments, a drone 702 carrying a calibration target may be dispatched to facilitate calibration of sensors of sensor array 144 of AV 140. As an example and not by way of limitation, drone 702 may be flown from a service facility or may be launched from service vehicle 602 in response to receiving information that sensor array 144 requires recalibration. In particular embodiments, drone 702 holding calibration target 102 may be flown around AV 140 (e.g., in a spiral or spherical pattern) while a computing system of AV 140 initiates and performs a sensor calibration procedure. As an example and not by way of limitation, drone 702 may be transported to the location of AV 140 (e.g., by service vehicle 602) and the pre-determined calibration path autonomously piloted by drone 702. As another example, drone 702 may be autonomously piloted to the location of AV 140 from the location of a service facility to fly the pre-determined path about AV 140 during calibration of the sensors of sensor array 144. In particular embodiments, the computing system of AV 140 may determine that a service vehicle is within a threshold distance from AV 140 or is available to travel to a location within a threshold distance from AV 140. Once the service vehicle is within the threshold distance from AV 140, a computing system of AV 140 may receive data indicating that drone 702 with the calibration target is being launched from the service vehicle. As described above, the computing system may receive positioning information of calibration target 102 relative to AV 140 from drone 702, the service vehicle, or a transportation management system/fleet management system. In particular embodiments, the computing system of AV 140 may initiate a calibration routine, described above, in response to receiving the positioning information of calibration target 102. Any suitable communication between drone 702 and the computing system of AV 140 may be completed to ensure the calibration routine is accurately completed.

Figure 8:
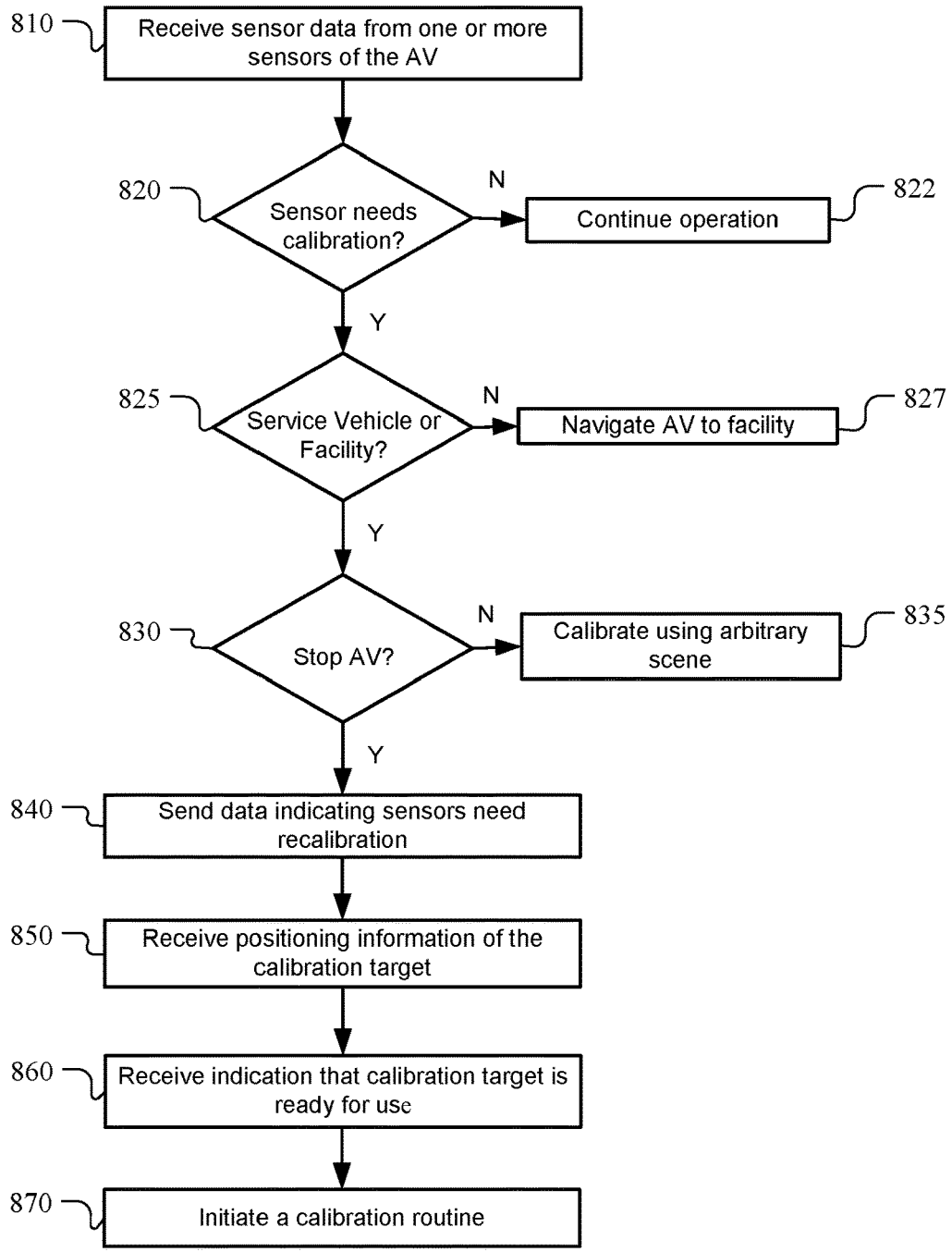
FIG. 8 illustrates an example of a method for calibrating sensors of autonomous vehicle in the field.

FIG. 8 illustrates an example method for calibrating sensors of autonomous vehicle in the field. The method 800 may begin at step 810, where a computing system of an AV receives sensor data from one or more sensors of the AV. As described above, the sensors of sensor array 144 may include an optical camera and LiDAR transceiver. At step 820, the computing system of the AV determines whether a first sensor of the one or more sensors needs recalibration based on the sensor data. In particular embodiments, the first sensor is of a first sensor type (e.g., an optical camera). As described above, the determination the first sensor may need recalibration may be determined when a difference between images captured by two optical cameras exceeds a certain threshold beyond the calibration reference. At step 822, the AV may continue normal operation if the difference between images captured by two optical cameras exceeds a certain threshold less than the calibration reference.

At step 825, a computing system of the AV may determine whether to match with a particular service vehicle or to send the AV to a service facility. In particular embodiments, the determination may be based on whether a service vehicle is within a threshold distance from the AV. At step 827, a computing system of the AV may navigate the AV to a service facility if an appropriate service vehicle is beyond a threshold distance. At step 830, the computing system may determine whether to instruct the AV to stop in response to determining that the first sensor needs recalibration. At step 835, as described above, the AV may attempt to re-calibrate itself based on arbitrary surroundings while continuing normal operation. At step 840, the computing system may send data to a remote management system indicating that one or more of the sensors of the AV need recalibration and a location of the AV at which the AV is stopped. Navigation of the AV may be difficult when the sensor performance does not correspond to the model used to determine navigation decisions. In particular embodiments, the service vehicle includes a calibration target that configured to be used for calibrating sensors of the first sensor type (e.g., an optical camera, a LIDAR, etc.). At step 850, the computing system of the AV may receive positioning information of the calibration target relative to the AV. As described above, the positioning information may include information of the distance and orientation of the calibration target relative to the AV.

At step 860, the computing system of the AV may receive an indication that the calibration target of the service vehicle is ready for use. At step 870, the computing system of the AV may initiate a calibration routine in response to the indication that the calibration target is ready for use. Particular embodiments may repeat one or more steps of the method of FIG. 8, where appropriate. Although this disclosure describes and illustrates particular steps of the method of FIG. 8 as occurring in a particular order, this disclosure contemplates any suitable steps of the method of FIG. 8 occurring in any suitable order. Moreover, although this disclosure describes and illustrates an example method for calibrating sensors of autonomous vehicle in the field including the particular steps of the method of FIG. 8, this disclosure contemplates any suitable method for calibrating sensors of autonomous vehicle in the field including any suitable steps, which may include all, some, or none of the steps of the method of FIG. 8, where appropriate. Furthermore, although this disclosure describes and illustrates particular components, devices, or systems carrying out particular steps of the method of FIG. 8, this disclosure contemplates any suitable combination of any suitable components, devices, or systems carrying out any suitable steps of the method of FIG. 8.

Figure 9:
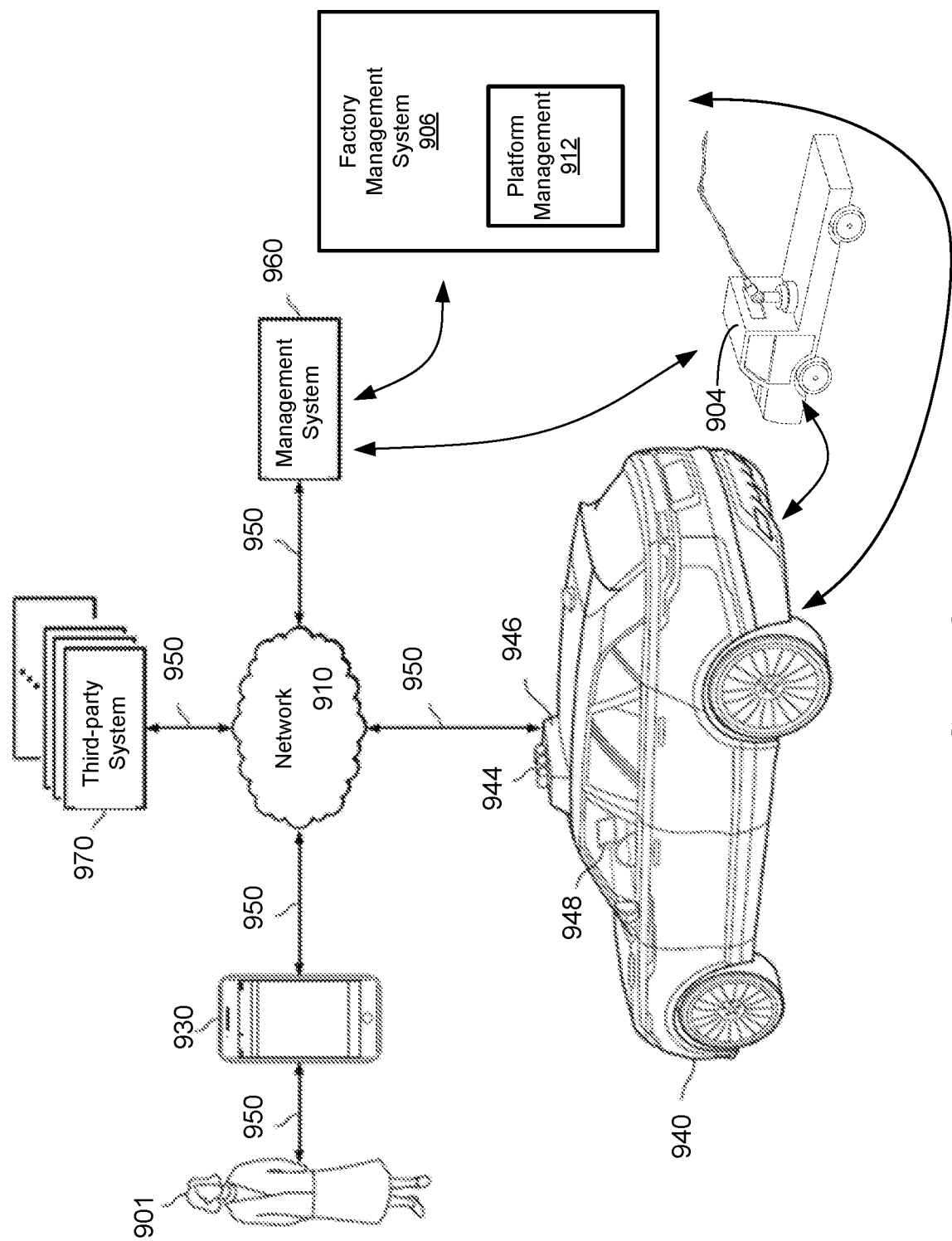
FIG. 9 illustrates an example block diagram of a transportation management environment.

FIG. 9 illustrates an example block diagram of a transportation management environment for matching ride requestors with autonomous vehicles. In particular embodiments, the environment may include various computing entities, such as a user computing device 930 of a user 901 (e.g., a ride provider or requestor), a transportation management system 960, an autonomous vehicle 940, and one or more third-party system 970. The computing entities may be communicatively connected over any suitable network 910. As an example and not by way of limitation, one or more portions of network 910 may include an ad hoc network, an extranet, a virtual private network (VPN), a local area network (LAN), a wireless LAN (WLAN), a wide area network (WAN), a wireless WAN (WWAN), a metropolitan area network (MAN), a portion of the Internet, a portion of Public Switched Telephone Network (PSTN), a cellular network, or a combination of any of the above. In particular embodiments, any suitable network arrangement and protocol enabling the computing entities to communicate with each other may be used. Although FIG. 9 illustrates a single user device 930, a single transportation management system 960, a single vehicles 940, a plurality of third-party systems 970, and a single network 910, this disclosure contemplates any suitable number of each of these entities. As an example and not by way of limitation, the network environment may include multiple users 901, user devices 930, transportation management systems 960, autonomous-vehicles 940, third-party systems 970, and networks 910.

The user device 930, transportation management system 960, autonomous vehicle 940, and third-party system may be communicatively connected or co-located with each other in whole or in part. These computing entities may communicate via different transmission technologies and network types. For example, the user device 930 and the vehicle 940 may communicate with each other via a cable or short-range wireless communication (e.g., Bluetooth, NFC, WI-FI, etc.), and together they may be connected to the Internet via a cellular network accessible to either one of the devices (e.g., the user device 930 may be a smartphone with LTE connection). The transportation management system 960 and third-party system 970, on the other hand, may be connected to the Internet via their respective LAN/WLAN networks and Internet Service Providers (ISP). FIG. 9 illustrates transmission links 950 that connect user device 930, autonomous vehicle 940, transportation management system 960, and third-party system 970 to communication network 910. This disclosure contemplates any suitable transmission links 950, including, e.g., wire connections (e.g., USB, Lightning, Digital Subscriber Line (DSL) or Data Over Cable Service Interface Specification (DOCSIS)), wireless connections (e.g., WI-FI, WiMAX, cellular, satellite, NFC, Bluetooth), optical connections (e.g., Synchronous Optical Networking (SONET), Synchronous Digital Hierarchy (SDH)), any other wireless communication technologies, and any combination thereof. In particular embodiments, one or more links 950 may connect to one or more networks 910, which may include in part, e.g., ad hoc network, the Intranet, extranet, VPN, LAN, WLAN, WAN, WWAN, MAN, PSTN, a cellular network, a satellite network, or any combination thereof. The computing entities need not necessarily use the same type of transmission link 950. For example, the user device 930 may communicate with the transportation management system via a cellular network and the Internet, but communicate with the autonomous vehicle 940 via Bluetooth or a physical wire connection.

In particular embodiments, the transportation management system 960 may fulfill ride requests for one or more users 901 by dispatching suitable vehicles. The transportation management system 960 may receive any number of ride requests from any number of ride requestors 901. In particular embodiments, a ride request from a ride requestor 901 may include an identifier that identifies him/her in the system 960. The transportation management system 960 may use the identifier to access and store the ride requestor's 901 information, in accordance with his/her privacy settings. The ride requestor's 901 information may be stored in one or more data stores (e.g., a relational database system) associated with and accessible to the transportation management system 960. In particular embodiments, ride requestor information may include profile information about a particular ride requestor 901. In particular embodiments, the ride requestor 901 may be associated with one or more categories or types, through which the ride requestor 901 may be associated with aggregate information about certain ride requestors of those categories or types. Ride information may include, for example, preferred pick-up and drop-off locations, driving preferences (e.g., safety comfort level, preferred speed, rates of acceleration/deceleration, safety distance from other vehicles when travelling at various speeds, route, etc.), entertainment preferences and settings (e.g., preferred music genre or playlist, audio volume, display brightness, etc.), temperature settings, whether conversation with the driver is welcomed, frequent destinations, historical riding patterns (e.g., time of day of travel, starting and ending locations, etc.), preferred language, age, gender, or any other suitable information. In particular embodiments, the transportation management system 960 may classify a user 901 based on known information about the user 901 (e.g., using machine-learning classifiers), and use the classification to retrieve relevant aggregate information associated with that class. For example, the system 960 may classify a user 901 as a teenager and retrieve relevant aggregate information associated with teenagers, such as the type of music generally preferred by teenagers.

Transportation management system 960 may also store and access ride information. Ride information may include locations related to the ride, traffic data, route options, optimal pick-up or drop-off locations for the ride, or any other suitable information associated with a ride. As an example and not by way of limitation, when the transportation management system 960 receives a request to travel from San Francisco International Airport (SFO) to Palo Alto, Calif., the system 960 may access or generate any relevant ride information for this particular ride request. The ride information may include, for example, preferred pick-up locations at SFO; alternate pick-up locations in the event that a pick-up location is incompatible with the ride requestor (e.g., the ride requestor may be disabled and cannot access the pick-up location) or the pick-up location is otherwise unavailable due to construction, traffic congestion, changes in pick-up/drop-off rules, or any other reason; one or more routes to navigate from SFO to Palo Alto; preferred off-ramps for a type of user; or any other suitable information associated with the ride. In particular embodiments, portions of the ride information may be based on historical data associated with historical rides facilitated by the system 960. For example, historical data may include aggregate information generated based on past ride information, which may include any ride information described herein and telemetry data collected by sensors in autonomous vehicles and/or user devices. Historical data may be associated with a particular user (e.g., that particular user's preferences, common routes, etc.), a category/class of users (e.g., based on demographics), and/or all users of the system 960. For example, historical data specific to a single user may include information about past rides that particular user has taken, including the locations at which the user is picked up and dropped off, music the user likes to listen to, traffic information associated with the rides, time of the day the user most often rides, and any other suitable information specific to the user. As another example, historical data associated with a category/class of users may include, e.g., common or popular ride preferences of users in that category/class, such as teenagers preferring pop music, ride requestors who frequently commute to the financial district may prefer to listen to news, etc. As yet another example, historical data associated with all users may include general usage trends, such as traffic and ride patterns. Using historical data, the system 960 in particular embodiments may predict and provide ride suggestions in response to a ride request. In particular embodiments, the system 960 may use machine-learning, such as neural-networks, regression algorithms, instance-based algorithms (e.g., k-Nearest Neighbor), decision-tree algorithms, Bayesian algorithms, clustering algorithms, association-rule-learning algorithms, deep-learning algorithms, dimensionality-reduction algorithms, ensemble algorithms, and any other suitable machine-learning algorithms known to persons of ordinary skill in the art. The machine-learning models may be trained using any suitable training algorithm, including supervised learning based on labeled training data, unsupervised learning based on unlabeled training data, and/or semi-supervised learning based on a mixture of labeled and unlabeled training data.

In particular embodiments, transportation management system 960 may include one or more servers. Each server may be a unitary server or a distributed server spanning multiple computers or multiple datacenters. The servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by the server. In particular embodiments, transportation management system 960 may include one or more data stores. The data stores may be used to store various types of information, such as ride information, ride requestor information, ride provider information, historical information, third-party information, or any other suitable type of information. In particular embodiments, the information stored in the data stores may be organized according to specific data structures. In particular embodiments, each data store may be a relational, columnar, correlation, or other suitable database system. Although this disclosure describes or illustrates particular types of databases, this disclosure contemplates any suitable types of databases. Particular embodiments may provide interfaces that enable a user device 930 (which may belong to a ride requestor or provider), a transportation management system 960, vehicle system 940, or a third-party system 970 to process, transform, manage, retrieve, modify, add, or delete the information stored in data store.

In particular embodiments, transportation management system 960 may include an authorization server (or other suitable component(s)) that allows users 901 to opt-in to or opt-out of having their information and actions logged, recorded, or sensed by transportation management system 960 or shared with other systems (e.g., third-party systems 970). In particular embodiments, a user 901 may opt-in or opt-out by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users 901 of transportation management system 960 through blocking, data hashing, anonymization, or other suitable techniques as appropriate.

In particular embodiments, third-party system 970 may be a network-addressable computing system that may host GPS maps, customer reviews, music or content, weather information, or any other suitable type of information. Third-party system 970 may generate, store, receive, and send relevant data, such as, for example, map data, customer review data from a customer review website, weather data, or any other suitable type of data. Third-party system may be accessed by the other computing entities of the network environment either directly or via network 910. For example, user device 930 may access the third-party system 970 via network 910, or via transportation management system 960. In the latter case, if credentials are required to access the third-party system 970, the user 901 may provide such information to the transportation management system 960, which may serve as a proxy for accessing content from the third-party system 970.

In particular embodiments, factory management system 906 may be a network-addressable computing system that may control particular functionality of a service facility. In particular embodiments, the factory management system 906 may be equipped with a processing unit (e.g., one or more CPUs and GPUs), memory, and storage. Factory management system 906 may be equipped to perform a variety of computational and processing tasks, including processing the sensor data, extracting useful information, and operating accordingly. As an example and not by way of limitation, factory management system 906 may include a platform management system 912 configured to provide instructions to a platform for transporting vehicle 940 within the service facility. Furthermore, platform management system 912 may be configured to receive data from one or more sensors of the platform or a track of the service facility to monitor the position of vehicle 940 on the platform and the location of the platform within the service facility. Factory management system 906 may be accessed by the other computing entities of the network environment either directly or via network 910. For example, transport management system 960 may communicate with factory management system 906 via a network (e.g., Internet). In particular embodiments, factory management system 906 may communication with an autonomous vehicle 940 (e.g., while the vehicle 940 is in or near the service facility) or its ride-service computing device 948 over direct short-range wireless connection (e.g., WI-FI, Bluetooth, NFC) and/or over a network (e.g., the Internet or via the transportation management system 960).

In particular embodiments, service vehicle 904 may include a network-addressable computing system that may control particular functionality, such as autonomous navigation or control of a calibration platform, as described above. Service vehicle 904 may be configured to receive data from one or more sensors from an autonomous vehicle 940 or its ride-service computing device 948, or one or more sensors of the calibration platform. Service vehicle 904 may be accessed by the other computing entities of the network environment either directly or via network 910. For example, transport management system 960 may communicate with service vehicle 904 via a network (e.g., Internet). The transportation management system 960 may provide instructions to the service vehicle 904, such as instructing the vehicle 904 or its driver where to drive to, when and how to prepare its calibration targets, the location and/or calibration needs of the autonomous vehicle 940, etc. In particular embodiments, the service vehicle 904 may be equipped with a processing unit (e.g., one or more CPUs and GPUs), memory, and storage. Service vehicle 904 may be equipped to perform a variety of computational and processing tasks, including processing the sensor data, extracting useful information, and operating accordingly. For example, based on images captured by its cameras and a machine-vision model, service vehicle 904 may determine a driving route to a location of vehicle 940 and control one or more functions of the calibration platform. In particular embodiments, the service vehicle 904 may communicate with the autonomous vehicle 940 over direct short-range wireless connection (e.g., WI-FI, Bluetooth, NFC) and/or over a network (e.g., the Internet or via the transportation management system 960). Communication between the service vehicle 904 and autonomous vehicle 940 may include, for example, relative positioning information between the vehicles, current configuration (e.g., position, orientation) of the calibration targets, calibration status, and any other information that would facilitate coordination of the calibration process.

In particular embodiments, user device 930 may be a mobile computing device such as a smartphone, tablet computer, or laptop computer. User device 930 may include one or more processors (e.g., CPU and/or GPU), memory, and storage. An operation system and applications may be installed on the user device 930, such as, e.g., a transportation application associated with the transportation management system 960, applications associated with third-party systems 970, and applications associated with the operating system. User device 930 may include functionality for determining its location, direction, or orientation, based on integrated sensors such as GPS, compass, gyroscope, or accelerometer. User device 930 may also include wireless transceivers for wireless communication, and may support wireless communication protocols such as Bluetooth, near-field communication (NFC), infrared (IR) communication, WI-FI, and/or 2G/3G/4G/LTE mobile communication standard. User device 930 may also include one or more cameras, scanners, touchscreens, microphones, speakers, and any other suitable input-output devices.

In particular embodiments, the vehicle 940 may be an autonomous vehicle and equipped with an array of sensors 944, a navigation system 946, and a ride-service computing device 948. In particular embodiments, a fleet of autonomous vehicles 940 may be managed by the transportation management system 960. The fleet of autonomous vehicles 940, in whole or in part, may be owned by the entity associated with the transportation management system 960, or they may be owned by a third-party entity relative to the transportation management system 960. In either case, the transportation management system 960 may control the operations of the autonomous vehicles 940, including, e.g., dispatching select vehicles 940 to fulfill ride requests, instructing the vehicles 940 to perform select operations (e.g., head to a service center or charging/fueling station, pull over, stop immediately, self-diagnose, lock/unlock compartments, change music station, change temperature, and any other suitable operations), and instructing the vehicles 940 to enter select operation modes (e.g., operate normally, drive at a reduced speed, drive under the command of human operators, and any other suitable operational modes).

In particular embodiments, the autonomous vehicles 940 may receive data from and transmit data to the transportation management system 960 and the third-party system 970. Example of received data may include, e.g., instructions, new software or software updates, maps, 3D models, trained or untrained machine-learning models, location information (e.g., location of the ride requestor, the autonomous vehicle 940 itself, other autonomous vehicles 940, and target destinations such as service centers), navigation information, traffic information, weather information, entertainment content (e.g., music, video, and news) ride requestor information, ride information, and any other suitable information. Examples of data transmitted from the autonomous vehicle 940 may include, e.g., telemetry and sensor data, determinations/decisions based on such data, vehicle condition or state (e.g., battery/fuel level, tire and brake conditions, sensor condition, speed, odometer, etc.), location, navigation data, passenger inputs (e.g., through a user interface in the vehicle 940, passengers may send/receive data to the transportation management system 960 and/or third-party system 970), and any other suitable data.

In particular embodiments, autonomous vehicles 940 may also communicate with each other as well as other traditional human-driven vehicles, including those managed and not managed by the transportation management system 960. For example, one vehicle 940 may communicate with another vehicle data regarding their respective location, condition, status, sensor reading, and any other suitable information. In particular embodiments, vehicle-to-vehicle communication may take place over direct short-range wireless connection (e.g., WI-FI, Bluetooth, NFC) and/or over a network (e.g., the Internet or via the transportation management system 960 or third-party system 970).

In particular embodiments, an autonomous vehicle 940 may obtain and process sensor/telemetry data. Such data may be captured by any suitable sensors. For example, the vehicle 940 may have a Light Detection and Ranging (LiDAR) sensor array of multiple LiDAR transceivers that are configured to rotate 360°, emitting pulsed laser light and measuring the reflected light from objects surrounding vehicle 940. In particular embodiments, LiDAR transmitting signals may be steered by use of a gated light valve, which may be a MEMs device that directs a light beam using the principle of light diffraction. Such a device may not use a gimbaled mirror to steer light beams in 360° around the autonomous vehicle. Rather, the gated light valve may direct the light beam into one of several optical fibers, which may be arranged such that the light beam may be directed to many discrete positions around the autonomous vehicle. Thus, data may be captured in 360° around the autonomous vehicle, but no rotating parts may be necessary. A LiDAR is an effective sensor for measuring distances to targets, and as such may be used to generate a three-dimensional (3D) model of the external environment of the autonomous vehicle 940. As an example and not by way of limitation, the 3D model may represent the external environment including objects such as other cars, curbs, debris, objects, and pedestrians up to a maximum range of the sensor arrangement (e.g., 50, 100, or 200 meters). As another example, the autonomous vehicle 940 may have optical cameras pointing in different directions. The cameras may be used for, e.g., recognizing roads, lane markings, street signs, traffic lights, police, other vehicles, and any other visible objects of interest. To enable the vehicle 940 to "see" at night, infrared cameras may be installed. In particular embodiments, the vehicle may be equipped with stereo vision for, e.g., spotting hazards such as pedestrians or tree branches on the road. As another example, the vehicle 940 may have radars for, e.g., detecting other vehicles and/or hazards afar. Furthermore, the vehicle 940 may have ultra sound equipment for, e.g., parking and obstacle detection. In addition to sensors enabling the vehicle 940 to detect, measure, and understand the external world around it, the vehicle 940 may further be equipped with sensors for detecting and self-diagnosing the its own state and condition. For example, the vehicle 940 may have wheel sensors for, e.g., measuring velocity; global positioning system (GPS) for, e.g., determining the vehicle's current geolocation; and/or inertial measurement units, accelerometers, gyroscopes, and/or odometer systems for movement or motion detection. While the description of these sensors provides particular examples of utility, one of ordinary skill in the art would appreciate that the utilities of the sensors are not limited to those examples. Further, while an example of a utility may be described with respect to a particular type of sensor, it should be appreciated that the utility may be achieving using any combination of sensors. For example, an autonomous vehicle 940 may build a 3D model of its surrounding based on data from its LiDAR, radar, sonar, and cameras, along with a pre-generated map obtained from the transportation management system 960 or the third-party system 970. Although sensors 944 appear in a particular location on autonomous vehicle 940 in FIG. 9, sensors 944 may be located in any suitable location in or on autonomous vehicle 940. Example locations for sensors include the front and rear bumpers, the doors, the front windshield, on the side paneling, or any other suitable location.

In particular embodiments, the autonomous vehicle 940 may be equipped with a processing unit (e.g., one or more CPUs and GPUs), memory, and storage. The vehicle 940 may thus be equipped to perform a variety of computational and processing tasks, including processing the sensor data, extracting useful information, and operating accordingly. For example, based on images captured by its cameras and a machine-vision model, the vehicle 940 may identify particular types of objects captured by the images, such as pedestrians, other vehicles, lanes, curbs, and any other objects of interest.

In particular embodiments, the autonomous vehicle 940 may have a navigation system 946 responsible for safely navigating the autonomous vehicle 940. In particular embodiments, the navigation system 946 may take as input any type of sensor data from, e.g., a Global Positioning System (GPS) module, inertial measurement unit (IMU), LiDAR transceivers, optical cameras, radio frequency (RF) transceivers, or any other suitable telemetry or sensory mechanisms. The navigation system 946 may also utilize, e.g., map data, traffic data, accident reports, weather reports, instructions, target destinations, and any other suitable information to determine navigation routes and particular driving operations (e.g., slowing down, speeding up, stopping, swerving, etc.). In particular embodiments, the navigation system 946 may use its determinations to control the vehicle 940 to operate in prescribed manners and to guide the autonomous vehicle 940 to its destinations without colliding into other objects. Although the physical embodiment of the navigation system 946 (e.g., the processing unit) appears in a particular location on autonomous vehicle 940 in FIG. 9, navigation system 946 may be located in any suitable location in or on autonomous vehicle 940. Example locations for navigation system 946 include inside the cabin or passenger compartment of autonomous vehicle 940, near the engine/battery, near the front seats, rear seats, or in any other suitable location.

In particular embodiments, the autonomous vehicle 940 may be equipped with a ride-service computing device 948, which may be a tablet or other suitable device installed by transportation management system 960 to allow the user to interact with the autonomous vehicle 940, transportation management system 960, other users 901, or third-party systems 970. In particular embodiments, installation of ride-service computing device 948 may be accomplished by placing the ride-service computing device 948 inside autonomous vehicle 940, and configuring it to communicate with the vehicle 940 via a wire or wireless connection (e.g., via Bluetooth). Although FIG. 9 illustrates a single ride-service computing device 948 at a particular location in autonomous vehicle 940, autonomous vehicle 940 may include several ride-service computing devices 948 in several different locations within the vehicle. As an example and not by way of limitation, autonomous vehicle 940 may include four ride-service computing devices 948 located in the following places: one in front of the front-left passenger seat (e.g., driver's seat in traditional U.S. automobiles), one in front of the front-right passenger seat, one in front of each of the rear-left and rear-right passenger seats. In particular embodiments, ride-service computing device 948 may be detachable from any component of autonomous vehicle 940. This may allow users to handle ride-service computing device 948 in a manner consistent with other tablet computing devices. As an example and not by way of limitation, a user may move ride-service computing device 948 to any location in the cabin or passenger compartment of autonomous vehicle 940, may hold ride-service computing device 948 in his/her lap, or handle ride-service computing device 948 in any other suitable manner. Although this disclosure describes providing a particular computing device in a particular manner, this disclosure contemplates providing any suitable computing device in any suitable manner.

Figure 10:
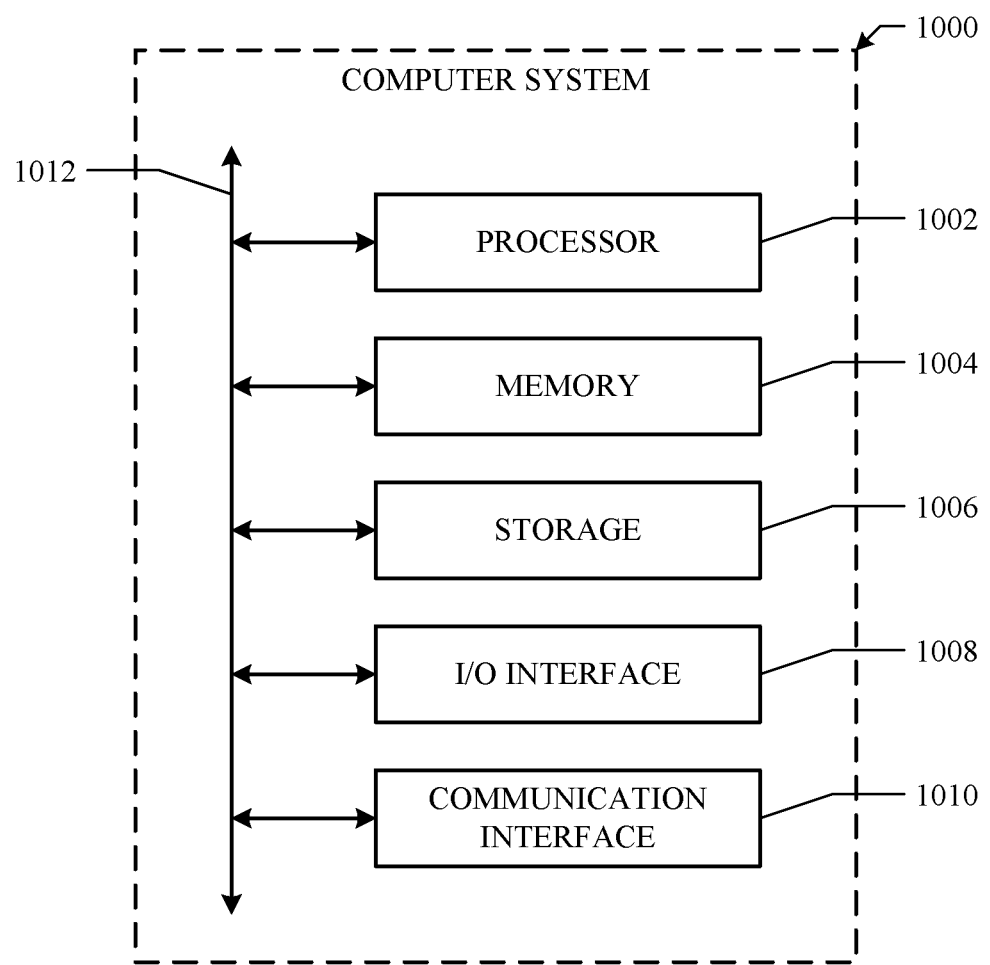
FIG. 10 illustrates an example of a computing system.

FIG. 10 illustrates an example computer system. In particular embodiments, one or more computer systems 1000 perform one or more steps of one or more methods described or illustrated herein. In particular embodiments, one or more computer systems 1000 provide functionality described or illustrated herein. In particular embodiments, software running on one or more computer systems 1000 performs one or more steps of one or more methods described or illustrated herein or provides functionality described or illustrated herein. Particular embodiments include one or more portions of one or more computer systems 1000. Herein, reference to a computer system may encompass a computing device, and vice versa, where appropriate. Moreover, reference to a computer system may encompass one or more computer systems, where appropriate.

This disclosure contemplates any suitable number of computer systems 1000. This disclosure contemplates computer system 1000 taking any suitable physical form. As example and not by way of limitation, computer system 1000 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1000 may include one or more computer systems 1000; be unitary or distributed; span multiple locations; span multiple machines; span multiple data centers; or reside in a cloud, which may include one or more cloud components in one or more networks. Where appropriate, one or more computer systems 1000 may perform without substantial spatial or temporal limitation one or more steps of one or more methods described or illustrated herein. As an example and not by way of limitation, one or more computer systems 1000 may perform in real time or in batch mode one or more steps of one or more methods described or illustrated herein. One or more computer systems 1000 may perform at different times or at different locations one or more steps of one or more methods described or illustrated herein, where appropriate.

In particular embodiments, computer system 1000 includes a processor 1002, memory 1004, storage 1006, an input/output (I/O) interface 1008, a communication interface 1010, and a bus 1012. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1002 includes hardware for executing instructions, such as those making up a computer program. As an example and not by way of limitation, to execute instructions, processor 1002 may retrieve (or fetch) the instructions from an internal register, an internal cache, memory 1004, or storage 1006; decode and execute them; and then write one or more results to an internal register, an internal cache, memory 1004, or storage 1006. In particular embodiments, processor 1002 may include one or more internal caches for data, instructions, or addresses. This disclosure contemplates processor 1002 including any suitable number of any suitable internal caches, where appropriate. As an example and not by way of limitation, processor 1002 may include one or more instruction caches, one or more data caches, and one or more translation lookaside buffers (TLBs). Instructions in the instruction caches may be copies of instructions in memory 1004 or storage 1006, and the instruction caches may speed up retrieval of those instructions by processor 1002. Data in the data caches may be copies of data in memory 1004 or storage 1006 for instructions executing at processor 1002 to operate on; the results of previous instructions executed at processor 1002 for access by subsequent instructions executing at processor 1002 or for writing to memory 1004 or storage 1006; or other suitable data. The data caches may speed up read or write operations by processor 1002. The TLBs may speed up virtual-address translation for processor 1002. In particular embodiments, processor 1002 may include one or more internal registers for data, instructions, or addresses. This disclosure contemplates processor 1002 including any suitable number of any suitable internal registers, where appropriate. Where appropriate, processor 1002 may include one or more arithmetic logic units (ALUs); be a multi-core processor; or include one or more processors 1002. Although this disclosure describes and illustrates a particular processor, this disclosure contemplates any suitable processor.

In particular embodiments, memory 1004 includes main memory for storing instructions for processor 1002 to execute or data for processor 1002 to operate on. As an example and not by way of limitation, computer system 1000 may load instructions from storage 1006 or another source (such as, for example, another computer system 1000) to memory 1004. Processor 1002 may then load the instructions from memory 1004 to an internal register or internal cache. To execute the instructions, processor 1002 may retrieve the instructions from the internal register or internal cache and decode them. During or after execution of the instructions, processor 1002 may write one or more results (which may be intermediate or final results) to the internal register or internal cache. Processor 1002 may then write one or more of those results to memory 1004. In particular embodiments, processor 1002 executes only instructions in one or more internal registers or internal caches or in memory 1004 (as opposed to storage 1006 or elsewhere) and operates only on data in one or more internal registers or internal caches or in memory 1004 (as opposed to storage 1006 or elsewhere). One or more memory buses (which may each include an address bus and a data bus) may couple processor 1002 to memory 1004. Bus 1012 may include one or more memory buses, as described in further detail below. In particular embodiments, one or more memory management units (MMUs) reside between processor 1002 and memory 1004 and facilitate accesses to memory 1004 requested by processor 1002. In particular embodiments, memory 1004 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1004 may include one or more memories 1004, where appropriate. Although this disclosure describes and illustrates particular memory, this disclosure contemplates any suitable memory.

In particular embodiments, storage 1006 includes mass storage for data or instructions. As an example and not by way of limitation, storage 1006 may include a hard disk drive (HDD), a floppy disk drive, flash memory, an optical disc, a magneto-optical disc, magnetic tape, or a Universal Serial Bus (USB) drive or a combination of two or more of these. Storage 1006 may include removable or non-removable (or fixed) media, where appropriate. Storage 1006 may be internal or external to computer system 1000, where appropriate. In particular embodiments, storage 1006 is non-volatile, solid-state memory. In particular embodiments, storage 1006 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1006 taking any suitable physical form. Storage 1006 may include one or more storage control units facilitating communication between processor 1002 and storage 1006, where appropriate. Where appropriate, storage 1006 may include one or more storages 1006. Although this disclosure describes and illustrates particular storage, this disclosure contemplates any suitable storage.

In particular embodiments, I/O interface 1008 includes hardware, software, or both, providing one or more interfaces for communication between computer system 1000 and one or more I/O devices. Computer system 1000 may include one or more of these I/O devices, where appropriate. One or more of these I/O devices may enable communication between a person and computer system 1000. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1008 for them. Where appropriate, I/O interface 1008 may include one or more device or software drivers enabling processor 1002 to drive one or more of these I/O devices. I/O interface 1008 may include one or more I/O interfaces 1008, where appropriate. Although this disclosure describes and illustrates a particular I/O interface, this disclosure contemplates any suitable I/O interface.

In particular embodiments, communication interface 1010 includes hardware, software, or both providing one or more interfaces for communication (such as, for example, packet-based communication) between computer system 1000 and one or more other computer systems 1000 or one or more networks. As an example and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1010 for it. As an example and not by way of limitation, computer system 1000 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1000 may communicate with a wireless PAN (WPAN) (such as, for example, a Bluetooth WPAN), a WI-FI network, a WI-MAX network, a cellular telephone network (such as, for example, a Global System for Mobile Communications (GSM) network), or other suitable wireless network or a combination of two or more of these. Computer system 1000 may include any suitable communication interface 1010 for any of these networks, where appropriate. Communication interface 1010 may include one or more communication interfaces 1010, where appropriate. Although this disclosure describes and illustrates a particular communication interface, this disclosure contemplates any suitable communication interface.

In particular embodiments, bus 1012 includes hardware, software, or both coupling components of computer system 1000 to each other. As an example and not by way of limitation, bus 1012 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1012 may include one or more buses 1012, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing system:
   based on sensor data of an autonomous vehicle (AV), determining that a calibration is to be performed on a first sensor of the AV;
   determining that a service vehicle is to travel to a location where the AV is stopped, the service vehicle having a calibration target configured to be used for calibration of the first sensor of the AV;

determining that the service vehicle is parked at or near the location where the AV is stopped;

receiving, from the service vehicle, first distance and orientation information determined by the service vehicle indicating a relative distance and orientation between the calibration target of the service vehicle and the first sensor of the AV;

receiving, from the AV, second distance and orientation information determined by the AV indicating a relative distance and orientation between the calibration target of the service vehicle and the first sensor of the AV, the second distance and orientation information being determined using a second sensor of the AV;

determining a refined distance and orientation information between the calibration target and the first sensor of the AV based on the first distance and orientation information determined by the service vehicle and the second distance and orientation information determined by the AV;

based on the refined distance and orientation information, determining whether the calibration target is in a position for calibration relative to the first sensor of the AV; and subsequent to determining that the calibration target is in the position for calibration, initiating a calibration routine for calibrating the first sensor of the AV, the calibration routine comprising:
  obtaining one or more sensor measurements of the calibration target using the first sensor of the AV,
  generating one or more expected sensor measurements of the calibration target using the refined distance and orientation information, and
  calibrating the first sensor of the AV based on a comparison between the one or more obtained sensor measurements and the one or more expected sensor measurements.

2. The method of claim 1, further comprising:
receiving, from the service vehicle, an indication that the calibration target of the service vehicle is ready for use; and
initiating the calibration routine in response to the indication that the calibration target is ready for use.

3. The method of claim 2, wherein the indication that the calibration target is ready for use comprises data indicating that a robotic arm of the service vehicle holding the calibration target has moved the calibration target to the position for calibration relative to the AV.

4. The method of claim 1, wherein the first distance and orientation information indicating the relative distance and orientation between the calibration target and the first sensor of the AV is determined based on an extension distance and degrees of rotation of a robotic arm of the service vehicle holding the calibration target.

5. The method of claim 1, wherein the first distance and orientation information indicating the relative distance and orientation between the calibration target and the first sensor of the AV is computed by the service vehicle.

6. The method of claim 1, further comprising:
adjusting at least one of a distance or orientation of the calibration target relative to the first sensor of the AV.

7. The method of claim 1, further comprising:
subsequent to determining that the calibration routine is to be performed on the first sensor of the AV, calibrating the first sensor based on surroundings of the AV;

wherein the determination that the service vehicle is to travel to the location where the AV is stopped is in response to a determination that an operation of the first sensor based on the surroundings of the AV fails to satisfy a threshold.

8. The method of claim 7, wherein, during the calibration routine, the refined distance and orientation information is used to determine whether the first sensor satisfies the threshold.

9. The method of claim 7, further comprising:
stopping the AV at the location in response to the determination that the operation of the first sensor based on the surroundings of the AV fails to satisfy the threshold.

10. The method of claim 1, wherein the computing system is the computing system of the AV, and the first distance and orientation information is sent by the service vehicle to the computing system of the AV.

11. The method of claim 1, wherein the first sensor is of a first sensor type and the second sensor is of a second sensor type different from the first sensor type.

12. The method of claim 11, wherein the different first and second sensor types are selected from the group consisting of an optical camera, a light detection and ranging sensor, and an ultrasound sensor.

13. One or more computer-readable non-transitory storage media embodying software that is operable when executed to cause one or more processors to perform operations comprising:
based on sensor data of an autonomous vehicle (AV), determine that a calibration is to be performed on a first sensor of the AV;

determine that a service vehicle is to travel to a location where the AV is stopped, the service vehicle having a calibration target configured to be used for calibration of the first sensor of the AV;

determine that the service vehicle is parked at or near the location where the AV is stopped;

receive, from the service vehicle, first distance and orientation information determined by the service vehicle indicating a relative distance and orientation between the calibration target of the service vehicle and the first sensor of the AV;

receive, from the AV, second distance and orientation information determined by the AV indicating a relative distance and orientation between the calibration target of the service vehicle and the first sensor of the AV, the second distance and orientation information being determined using a second sensor of the AV;

determine a refined distance and orientation information between the calibration target and the first sensor of the AV based on the first distance and orientation information determined by the service vehicle and the second distance and orientation information determined by the AV;

based on the refined distance and orientation information, determine whether the calibration target is in a position for calibration relative to the first sensor of the AV; and subsequent to determining that the calibration target is in the position for calibration, initiate a calibration routine for calibrating the first sensor of the AV, the calibration routine comprising:
  obtaining one or more sensor measurements of the calibration target using the first sensor of the AV,
  generating one or more expected sensor measurements of the calibration target using the refined distance and orientation information determined by the service vehicle, and calibrating the first sensor of the AV based on a comparison between the one or more obtained sensor measurements and the one or more expected sensor measurements.

14. The one or more computer-readable non-transitory storage claim 13, wherein the software is further operable to:
receive, from the service vehicle, an indication that the calibration target of the service vehicle is ready for use; and
initiate the calibration routine in response to the indication that the calibration target is ready for use.

15. The one or more computer-readable non-transitory storage claim 14, wherein the indication that the calibration target is ready for use comprises data indicating that a robotic arm of the service vehicle holding the calibration target has moved the calibration target to the position for calibration relative to the AV.

16. The one or more computer-readable non-transitory storage claim 13, wherein the first distance and orientation information indicating the relative distance and orientation between the calibration target and the first sensor of the AV is determined based on an extension distance and degrees of rotation of a robotic arm of the service vehicle holding the calibration target.

17. A system comprising:
one or more processors and one or more computer-readable non-transitory storage media coupled to one or more of the processors, the one or more computer-readable non-transitory storage media comprising instructions operable when executed by the one or more processors to cause the system to perform operations comprising:
based on sensor data of an autonomous vehicle (AV), determine that a calibration is to be performed on a first sensor of the AV;
determine that a service vehicle is to travel to a location where the AV is stopped, the service vehicle having a calibration target configured to be used for calibration of the first sensor of the AV;
determine that the service vehicle is parked at or near the location where the AV is stopped;
receive, from the service vehicle, first distance and orientation information determined by the service vehicle indicating a relative distance and orientation between the calibration target of the service vehicle and the first sensor of the AV;
receive, from the AV, second distance and orientation information determined by the AV indicating a relative distance and orientation between the calibration target of the service vehicle and the first sensor of the AV, the second distance and orientation information being determined using a second sensor of the AV;
determine a refined distance and orientation information between the calibration target and the first sensor of the AV based on the first distance and orientation information determined by the service vehicle and the second distance and orientation information determined by the AV;
based on the refined distance and orientation information, determine whether the calibration target is in a position for calibration relative to the first sensor of the AV; and
subsequent to determining that the calibration target is in the position for calibration, initiate a calibration routine for calibrating the first sensor of the AV, the calibration routine comprising:
obtaining one or more sensor measurements of the calibration target using the first sensor of the AV;
generating one or more expected sensor measurements of the calibration target using the refined distance and orientation information; and
calibrating the first sensor of the AV based on a comparison between the one or more obtained sensor measurements and the one or more expected sensor measurements.

18. The system of claim 17, wherein the processors are further operable to:
receive, from the service vehicle, an indication that the calibration target of the service vehicle is ready for use; and
initiate the calibration routine in response to the indication that the calibration target is ready for use.

19. The system of claim 18, wherein the indication that the calibration target is ready for use comprises data indicating that a robotic arm of the service vehicle holding the calibration target has moved the calibration target to the position for calibration relative to the AV.

20. The system of claim 17, wherein the first distance and orientation information indicating the relative distance and orientation between the calibration target and the first sensor of the AV is determined based on an extension distance and degrees of rotation of a robotic arm of the service vehicle holding the calibration target.

* * * * *